(12) United States Patent
Voit et al.

(10) Patent No.: US 7,042,880 B1
(45) Date of Patent: May 9, 2006

(54) CONGESTION AND THROUGHPUT VISIBILITY AND ISOLATION

(75) Inventors: Eric A. Voit, Bethesda, MD (US); Robert T. Baum, Gaithersburg, MD (US); Jeffrey Ian Winter, Silver Spring, MD (US)

(73) Assignee: Verizon Services Corp., Arlington, VA (US)

( * ) Notice: Subject to any disclaimer, the term of this patent is extended or adjusted under 35 U.S.C. 154(b) by 1052 days.

(21) Appl. No.: 09/688,213

(22) Filed: Oct. 16, 2000

Related U.S. Application Data

(63) Continuation-in-part of application No. 09/635,695, filed on Aug. 10, 2000, now Pat. No. 6,904,054.

(51) Int. Cl.
*H04L 12/28* (2006.01)

(52) U.S. Cl. .................. 370/395.1; 370/395.5
(58) Field of Classification Search .......... 370/241, 370/242, 244, 245, 248, 250–252, 395.1, 370/352, 395.5, 395.52, 395.6, 395.63, 401
See application file for complete search history.

(56) References Cited

U.S. PATENT DOCUMENTS

| | | | |
|---|---|---|---|
| 5,247,347 A | 9/1993 | Litteral et al. | |
| 5,410,343 A | 4/1995 | Coddington et al. | |
| 5,600,632 A | 2/1997 | Schulman | |
| 5,621,728 A | 4/1997 | Lightfoot et al. | |
| 5,790,548 A | 8/1998 | Sistanizadeh et al. | |
| 5,812,786 A | 9/1998 | Seazholtz et al. | |
| 5,905,781 A | 5/1999 | McHale et al. | |
| 5,917,820 A * | 6/1999 | Rekhter | 370/392 |
| 5,958,016 A | 9/1999 | Chang et al. | |
| 6,028,846 A | 2/2000 | Cain | |
| 6,081,517 A | 6/2000 | Liu et al. | |
| 6,452,925 B1 * | 9/2002 | Sistanizadeh et al. | 370/352 |
| 6,636,505 B1 * | 10/2003 | Wang et al. | 370/352 |
| 6,654,914 B1 * | 11/2003 | Kaffine et al. | 714/43 |

* cited by examiner

*Primary Examiner*—Man U. Phan
*Assistant Examiner*—Toan Nguyen
(74) *Attorney, Agent, or Firm*—Leonard C. Suchyta, Esq.; Joel Wall, Esq.; Rader Fishman & Grauer PLLC.

(57) ABSTRACT

Offering vertical services to subscribers and service providers is an avenue to immediately improve the competitiveness of digital subscriber line access service, for example of the type offered by a local exchange carrier. To deliver high-quality vertical services, however, the underlying ADSL Data Network (ADN) or the like needs to establish Quality of Service (QoS) as a core characteristic and offer an efficient mechanism for insertion of the vertical services. The inventive network architecture introduces QoS into the ADN, in a manner that enables the delivery of sophisticated and demanding IP-based services to subscribers, does not affect existing Internet tiers of service, and is cost-effective in terms of initial costs, build-out, and ongoing operations. The architecture utilizes a switch capable of examining and selectively forwarding packets or frames based on higher layer information in the protocol stack, that is to say on information that is encapsulated in the layer-2 information utilized to define normal connectivity through the network. The switch enables segregation of upstream traffic by type and downstream aggregation of Internet traffic together with traffic from a local services domain for vertical services and other local services. Systems coupled to the local services domain alone or in combination with software in servers and/or a user's computer enable a testing of connectivity, throughput, QoS metrics and the like through selected points of the ADN network.

14 Claims, 13 Drawing Sheets

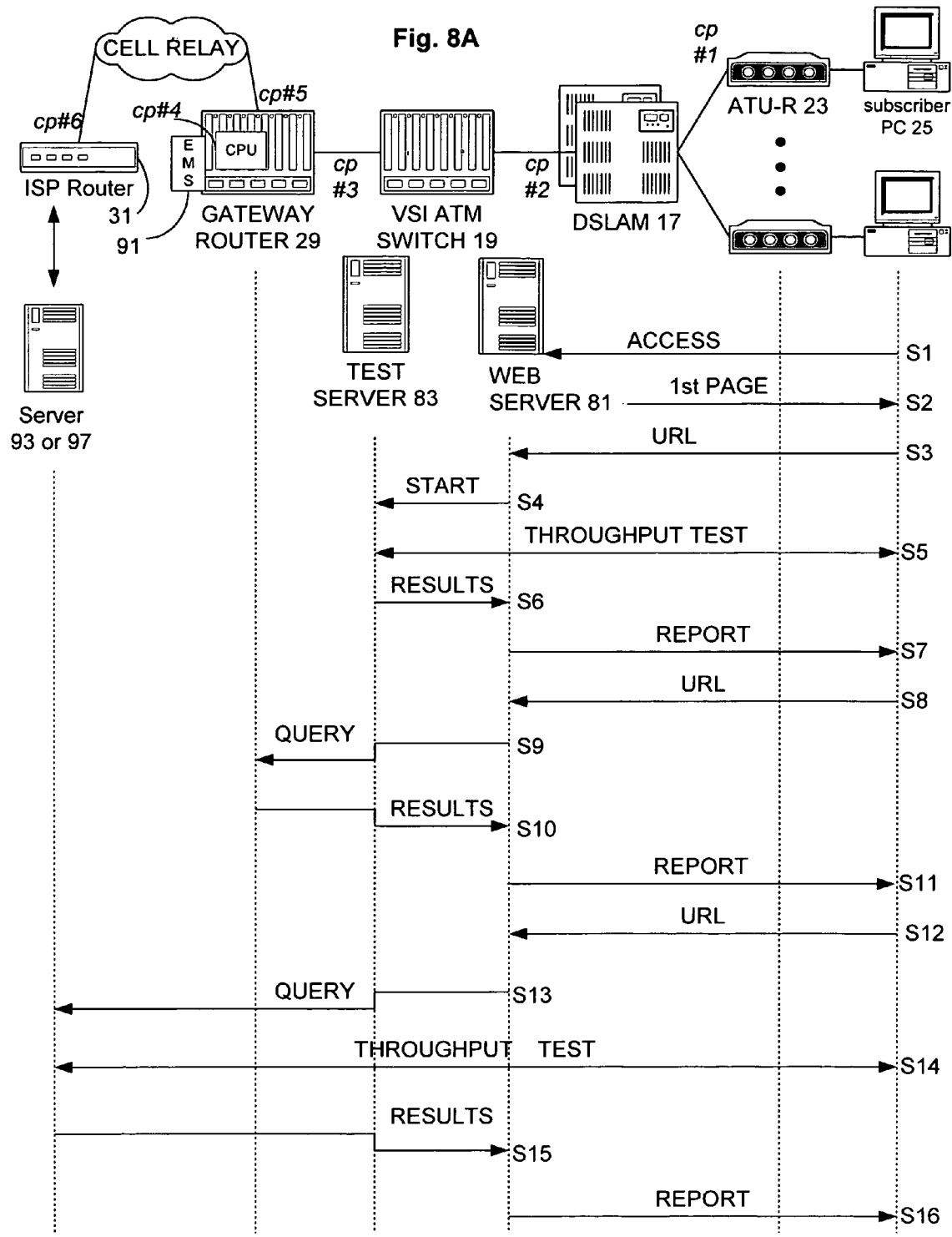

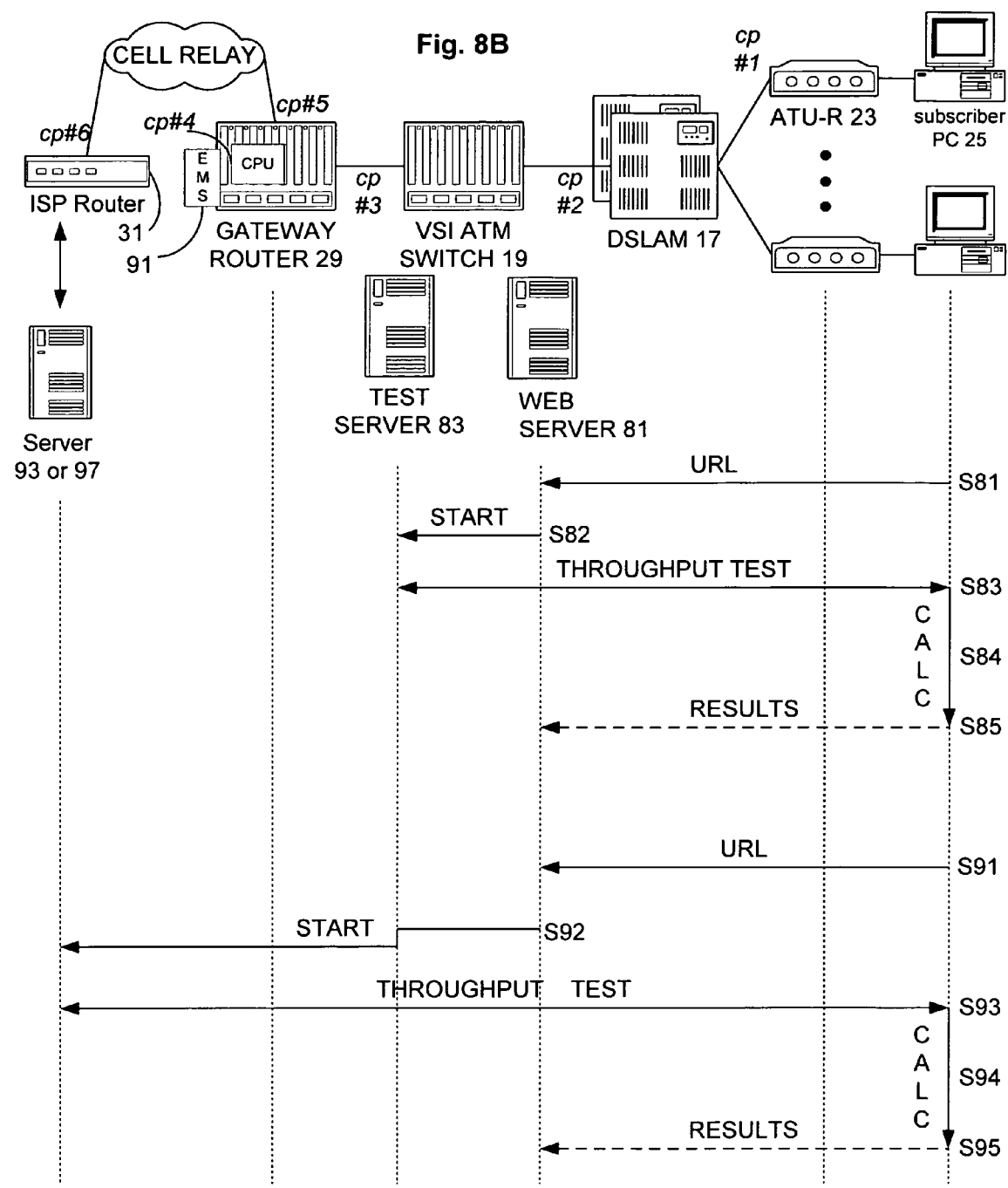

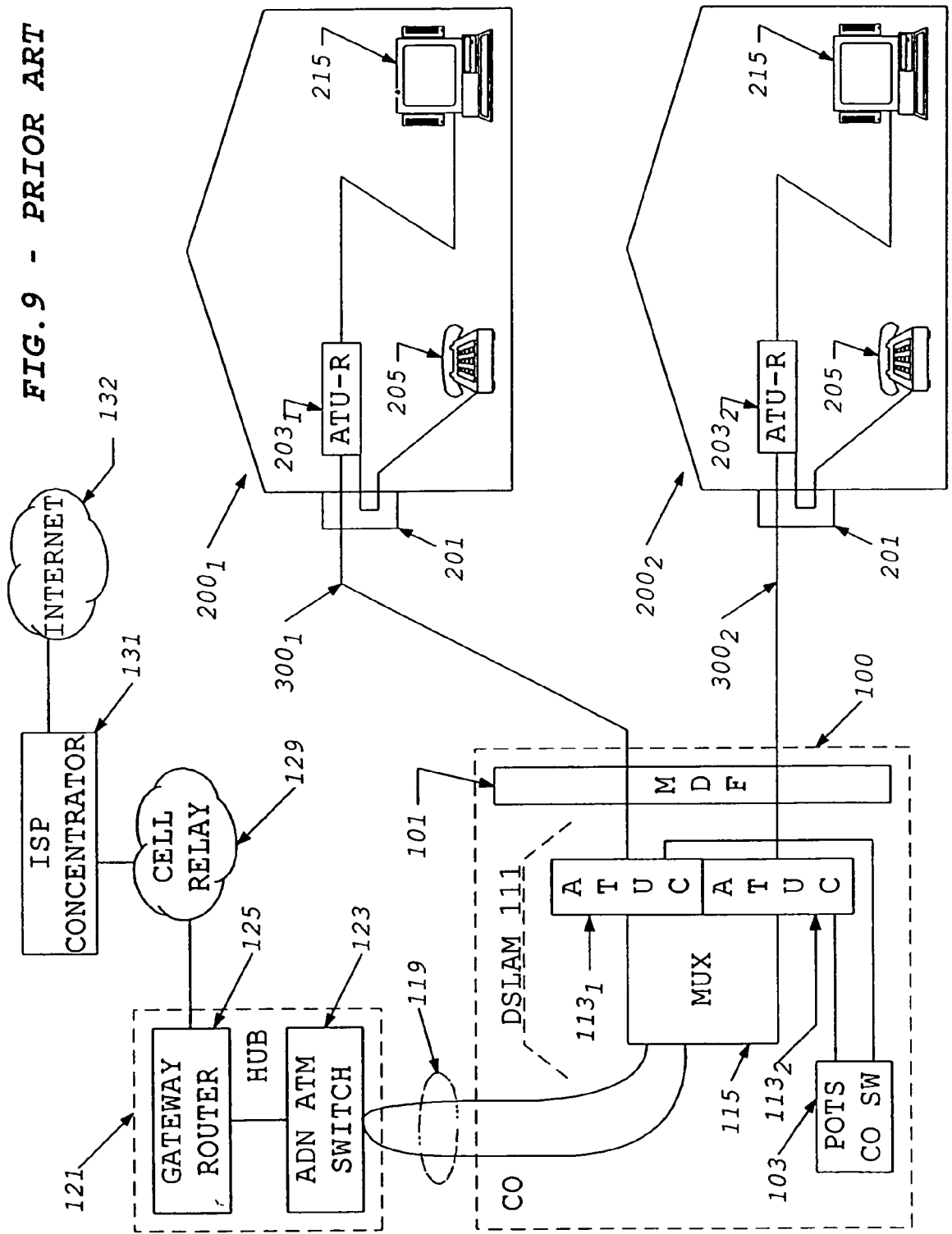
FIG. 9 - PRIOR ART

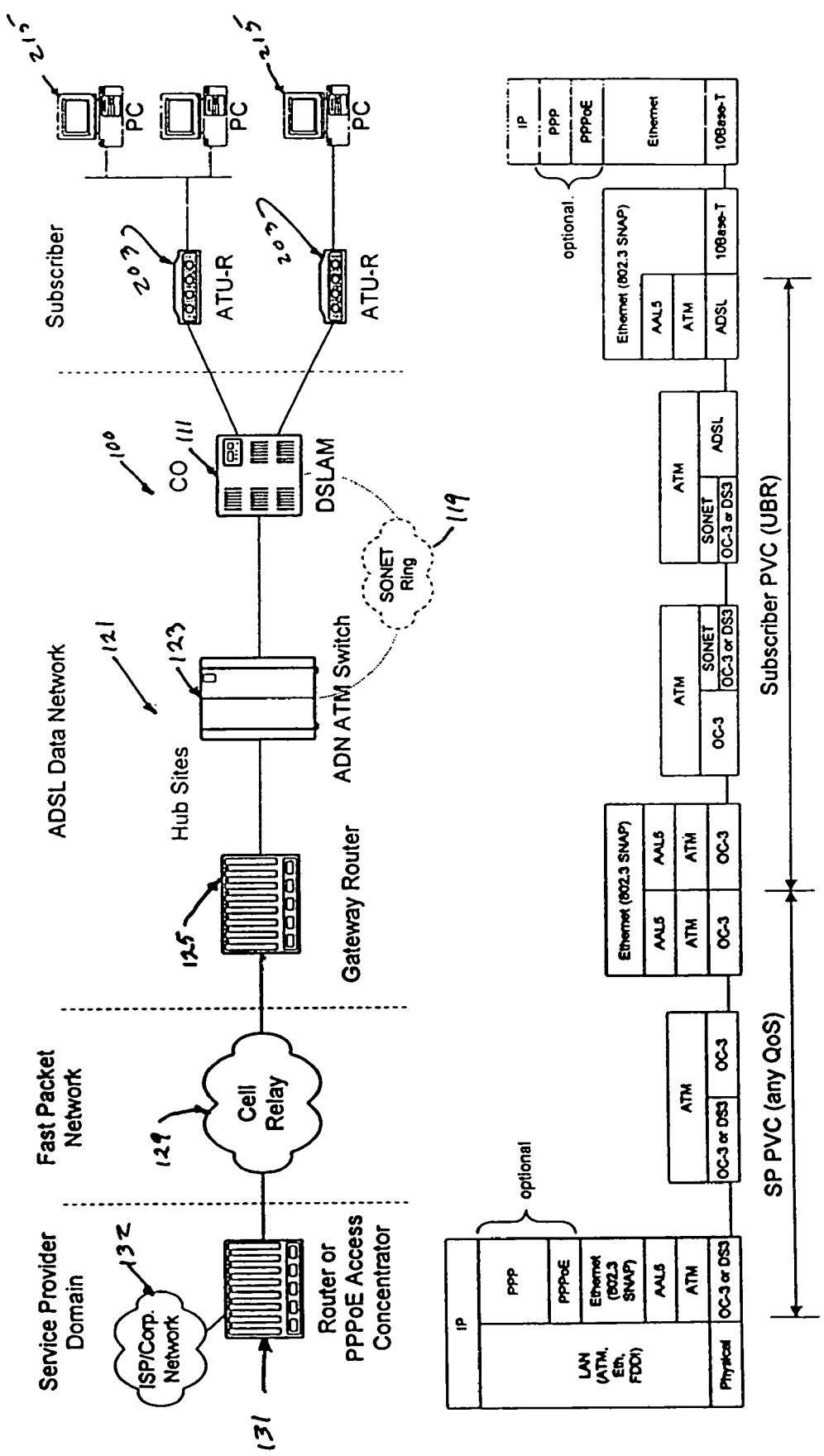
FIG. 10 - PRIOR ART

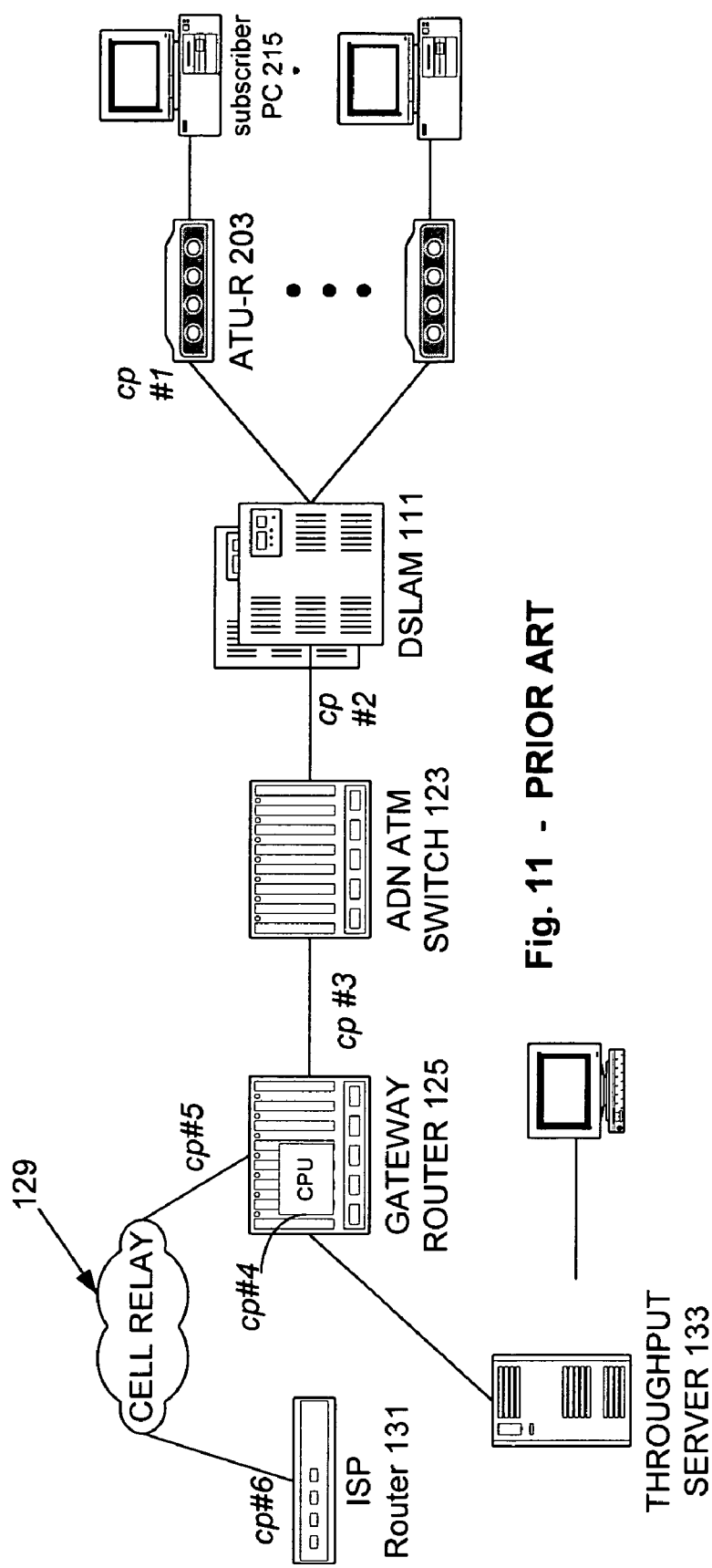
Fig. 11 - PRIOR ART

CONGESTION AND THROUGHPUT VISIBILITY AND ISOLATION

This application is a continuation in part of U.S. patent application Ser. No. 09/635,695, now U.S. Pat. No. 6,904,054 filed Aug. 10, 2000 entitled "SUPPORT FOR QUALITY OF SERVICE AND VERTICAL SERVICES IN DIGITAL SUBSCRIBER LINE DOMAIN", the disclosure of which is incorporated herein entirely by reference.

FIELD OF THE INVENTION

Certain concepts involved in the present invention relate to techniques for implementing data communication services, for example in a local access network utilizing digital subscriber line technology, to support quality of service (QoS) and local introduction of vertical services. Other concepts involved in the present invention relate to automated techniques for operations support for such a network, particularly monitoring and assessment of performance for quality assurance.

BACKGROUND

Modern society continues to create exponentially increasing demands for digital information and the communication of such information between data devices. Local area networks use a network, cable or other media to link stations on the network for exchange of information in the form of packets of digital data. These networks have proven quite successful in providing data communications in commercial applications. However, the common local area network architectures require installation of specialized wiring and use of specific wiring topologies. For example, the most popular network protocols, such as Ethernet, require special rules for the wiring, for example with regard to quality of wire, range of transmission and termination. Furthermore, to extend communications to a wider domain still requires connection of at least one node of the local area network out to a wider area network, such as the network of an Internet Service Provider (ISP). High speed links enabling such wide area access from a LAN domain, for example using T1 lines, are quite expensive and justified only for hi-end commercial users.

The most common form of computer-to-computer communication in use today, particularly for wide area communications, still relies on modems and analog telephone network connections. The data rates that are possible through the telephone network are quite low. Even with a variety of recent enhancements, the data speeds remain at or below 56 kbps. Integrated Services Digital Network (ISDN) offers somewhat faster data communications and the capacity for concurrent data and voice telephone services. The 160 kb/s capacity carries two bearer (B) channels, each at 64 kb/s, one data (D) channel at 16 kb/s and overhead information in a 16 kb/s embedded operations channel (EOC). Some applications allow aggregation of the channels, to combine the B-channels and possibly the D-channel to provide data communications up to the combined rate of 144 kb/s. However, these data rates offered by ISDN already are too slow for many multimedia applications.

A number of technologies are being developed and are in early stages of deployment, fro providing substantially higher rates of data communication, for example ranging from 640 kb/s to 7.1 Mb/s. For example, cable television companies are now beginning to offer 'cable modem' services, which allow customers to communicate data over available bandwidth on the coaxial cable of a cable television network. After considering several other options, a number of the local telephone carriers are working on enhancements to their existing copper-wire loop networks, based on various xDSL technologies.

The term xDSL here is used as a generic term for a group of higher-rate digital subscriber line communication schemes capable of utilizing twisted pair wiring from an office or other terminal node of a telephone network to the subscriber premises. Examples under various stages of development include ADSL (Asymmetrical Digital Subscriber Line), HDSL (High data rate Digital Subscriber Line) and VDSL (Very high data rate Digital Subscriber Line).

The telephone carriers originally proposed use of ADSL and similar high-speed technologies to implement digital video services, for example in networks sometimes referred to as video 'dialtone' networks. The ADSL line technology provided a mechanism for high-speed transport of MPEG encoded video information to video terminal devices in the customers' homes. Examples of such ADSL-based video dialtone networks are disclosed in U.S. Pat. Nos. 5,247,347, 5,410,343 and 5,621,728. The carriers are now deploying a range of xDSL data services targeted at high-speed Internet access and high-speed access to private data networks. U.S. Pat. No. 5,790,548 to Sistanizadeh et al. discloses an example of an ADSL based data network, e.g. for high-speed access to the Internet and to corporate LANs.

The current design goals of DSL data networks for Internet access do not support high-end vertical services, that is to say services demanding IP-based applications that require assurance of some level of quality of service (QoS). For example, packet-switched Voice over IP (VoIP) requires low latency, low jitter (i.e., a relatively constant bit rate), and non-correlated packet loss. Streaming video has similar requirements, and in addition, requires high bandwidth. DSL data networks designed to support high speed Internet and Intranet access have been optimized to support traffic that is bursty and is not sensitive to latency or jitter. For example, current implementations supporting ATM cell traffic employ the Unspecified Bit Rate (UBR) class of service, which does not provide any bandwidth or delay guarantees. Consequently, transport of video materials through such DSL data networks inflicts video delays, loss of audio/video synchronization, and image fragmentation.

Furthermore, lengthy bandwidth intensive sessions for video or other broadband applications may degrade the throughput to all other subscribers served through a shared node, such as a gateway router or a concentrated link. For two-way video, upstream will have even worse quality and throughput problems, due to the best effort nature of the DSL data network implemented for Internet access and because the upstream bandwidth is significantly less than that of the downstream channel.

To appreciate the situation and problems, it may be helpful here to consider an ADSL data implementation of a local access network, as a representative example, in somewhat more detail. FIG. 9 is a block diagram of a typical ADSL data network of the type currently in-use by a number of incumbent and competitive local exchange carriers to provide high-speed access to Internet Service Providers (ISPs) and thus to the Internet. FIG. 10 provides an alternative functional illustration of the elements of such a network. Of particular note, FIG. 10 shows the various protocol stacks in association with the appropriate network elements.

As shown in FIG. 9, a central office (CO) 100 provides plain old telephone service (POTS) and digital subscriber line data service for a number of customers. For purposes of discussion, assume that the equipment at each of the various customer premises 200 connects directly to the CO 100 via a twisted pair type copper wiring 300. In an actual implementation, many customers may connect through such wiring to a remote terminal linked to the CO via optical fiber.

At each customer premises 200 in our example, the copper loop 300 carrying both the POTS and ADSL signals connects through a Network Interface Device (NID) 201 placed at the side of the home. A two pair loop is installed from the NID to the location where the ADSL unit 203, typically an ATU-R modem, is located in the home. One pair connects all of the signals on the line 300 from the NID 201 to the ADSL modem 203. Within the ATU-R type modem 203, a passive splitter/combiner type filter segregates the POTS signal and the data signals. The POTS signal is transmitted over the second twisted pair back to the NID 201. The POTS line is then connected to the in-home wiring extensions at the NID 201, for distribution to one or more standard telephone devices 205 in the home.

Within the ATU-R type ADSL modem 203, the downstream coded ADSL signal is demodulated and decoded to an appropriate data interface protocol for connection to the PC 215. The PC 215 or other data device (FIG. 10) also sends data to the ADSL modem 203. The modem 203 modulates the upstream data and transmits appropriate signals over the line 300, or 3002 to the corresponding modem 113, or 1132 in the CO 100 (FIG. 9). The ATU-R interface may support bridging, such that multiple users can share the ADSL modem 203, for two-way data communication through the CO 100.

The lines 300 for the customer premises 200 connect through the main distribution frame (MDF) 101 to a Digital Subscriber Line Access Multiplexer (DSLAM) 111. The DSLAM includes a bank of ADSL terminal units of the type intended for central office applications, identified as ATU-Cs 113. The DSLAM also includes a multiplexer/demultiplexer (MUX) 115.

Within the DSLAM 111, each customer line 300 connects to an assigned ADSL terminal unit 113 in the central office (ATU-C). In the example illustrated, the first customer's line 300₁ connects through the MDF 101 to a first ATU-C 113₁ in the CO 100. The second customer's line 300₂ connects through the MDF 101 to a second ATU-C 113₂ in the CO 100. The ATU-C type ADSL units 113 include appropriate frequency dependent combiner/splitters, for segregating out the voice telephone traffic. Thus each ADSL unit 113 provides a connection for telephone traffic from the associated line 300 to the POTS switch 103.

The ADSL units 113 in the CO (ATU-Cs) essentially act as modulator/demodulators (modems) for sending and receiving data over the subscriber telephone lines 300. On the network side, each of the ATU-Cs 113 connects to the MUX 115. The MUX 115 multiplexes and demultiplexes the upstream and downstream data for the ADSL modems 113 and provides a connection to a high-speed link 119. Through subtending, the MUX 115 may also provide a data concentration for the communications over the link 119.

In a typical implementation, the concentrated data communications utilize a DS-3 link 119. However, because of increasing traffic demands, it is becoming necessary to upgrade the link 119 to SONET optical fiber, such as OC-3 or in some cases even OC-12. The link 119 provides two-way data communication between the central office 100 and a data hub 121. In practice, this is a relatively long or wide area link using expensive interoffice facilities.

On the upstream side, the high-speed interoffice link 119 terminates on an ATM switch 123 for the ADSL data network (ADN). Although only one link 119 appears in the drawing, the asynchronous transfer mode (ATM) switch 123 will typically service a number of DSLAMs 111 in various end offices via similar DS or OC links. The ATM switch 123, in turn, provides a high-speed connection to a gateway router 125 coupled to an ATM cell relay network 129. Typically, the ATM switch 123 will aggregate traffic from a number of such links 119 onto an OC-3 or higher rate SONET link to the router 125. The router 125 and the cell relay network 129 enable transport of ATM cells for the subscribers to and from equipment of one or more Internet Service Providers (ISPs), shown by way of example as a concentrator 131 coupled to the public packet switched network commonly known as the Internet 132.

The illustrated local access type ADN network provides ATM cell transport from a customer premises 200 to the ISP concentrator 131. The ATM cells serve as the layer-2 routing or switching protocol for the lowest level definition of connectivity between two points of the network. Higher level protocols ride within the ATM cells.

The ATU-Rs 203 and the customer premises data equipment 215 connect via an Ethernet coupler. The customers' equipment communicates across the ADSL data network utilizing Ethernet, and the wide area communication involves transport of Internet protocol information typically in TCP/IP frames within Ethernet frames. The Ethernet frames carrying the TCP/IP frames are adapted into ATM cells. Attention is directed to the protocol stacks illustrated in the lower half of FIG. 1Q.

To efficiently provide cell relay, each customer is assigned an ATM virtual circuit that extends from the ATU-R 203 in the respective customer premises 200 to the gateway router 125. Although it was originally envisioned that ATM would support switched logical channels or virtual circuits, to date, such logical switching has proven impractical to implement and administer. Consequently, current practical ATM networks actually utilize permanent virtual circuits (PVCs), not switched virtual circuits (SVCs). For a given subscriber, the carrier therefore provisions an ATM permanent virtual circuit (PVC) from the ATU-R 203 to the gateway router 125. The carrier programs one or more nodes along the path of that logical circuit, particularly the DSLAM 111, to regulate traffic on the virtual circuit to the upstream and downstream rates corresponding to the grade of service to which the particular customer subscribers. All data traffic for the subscriber goes over the entire length of the permanent virtual circuit (PVC), and most if not all nodes along that path limit that traffic to the rates of the subscription as defined in the provisioning data.

The virtual circuit may be thought of as a solid pipe. All traffic passes through the entire length of the pipe-like virtual circuit, regardless of how many switches or other nodes the circuit passes through. The layer-2 protocol defining the circuit carries all of the higher level traffic end-to-end. Higher layer protocols are visible only at the ends of the pipe. Hence, any traffic flow processing intended to utilize the higher layers must occur at some point past one end or the other end of the virtual circuit.

The gateway router 125 also terminates permanent virtual circuits (PVCs) through the cell relay network 129 going to/from the ISP concentrators 131. The gateway router 125 aggregates traffic between a number of subscribers and each respective ISP. The ISP equipment 131 typically implements a variation of a point-to-point protocol (PPP) specifically adapted to ride over Ethernet, referred to as "PPP over Ethernet" (PPPoE). The virtual circuits to the ISPs, however, do not have sufficient capacity to simultaneously carry all subscriber traffic at the maximum rates of the customers' subscriptions. The MUX 115, the ATM switch 123, and the gateway router 125 concentrate and regulate the subscriber traffic going to and from the ISPs, typically on some type of "best efforts" basis.

In a typical Internet access service offering, the most expensive service tier provides 7.1 Mbps for downstream communication and 680 kbps for upstream communication. The next grade of service provides 1.6 Mbps for downstream communication and 90 kbps for upstream communication, whereas the lowest tier of service provides 640 kbps for downstream communication and 90 kbps for upstream communication. The maximum grade of service offered to an individual subscriber depends on the rates for which the subscriber's line can qualify, although the subscriber may opt for a lower rate service since the higher-rate service is more expensive.

The approach outlined above relative to FIGS. 9 and 10 works well for Internet access if the traffic relates to web access, file transfers and the like, which do not require guaranteed quality of service. Various segments of the Internet industry, however, are rapidly developing new multimedia services and applications that already are pushing the capabilities of such a network. For example, increasingly, Internet traffic includes a number of types of communication that require a guaranteed quality of service. Voice telephone communication over IP is extremely sensitive to latency and jitter. The permanent virtual circuits (PVCs) provide an unspecified bit rate (UBR) service and do not guarantee any minimal amount of delay or jitter. Also, because the rates are set by subscription, the service tends to be relatively inflexible. Some services, such as multicasting of broadband information from the Internet into the local access ADN for a large number of concurrent users, can quickly overload one or more nodes or critical links of the network, for example the link 119 between the DSLAM 111 and the ATM switch 123 at the hub 121.

Most industry experts propose to increase the services available via the public Internet. However, because the higher layer protocols are visible only on the Internet side of the virtual circuit "pipe," these services all must be implemented out past the end of the virtual circuit, at least behind the gateway router 129 and most likely in the public network, where it is possible to view and route based on higher level protocols, particularly Internet Protocol (IP). Such a migration strategy to implement new services creates severe problems. For example, in the network of FIG. 9, if a customer at premises 200, desired to order a video on demand, the customer would communicate via the assigned permanent virtual circuit (PVC) and the ISP to a server on the Internet 132. The server would send the video stream back through the Internet 132, the ISP equipment 131, the cell relay network 129 and the virtual circuit from the router 125 to the ATU-R 203 for handoff to a PC or the like at 215. If the rate of the requested video exceeds the customer's subscription rate, the customer could not view the video in real time during the download. Even if the rate of the requested video is below the customer's subscription rate, loading in the Internet or the local access network may impose delays and/or jitter in communication of some segments of the requested video. Assuming that the hub 121 and the links 119 implement a subscriber concentration, ordering of numerous videos or similar broadband files from the Internet 132 quickly consumes the shared resources through the hub 121 and the links 119, reducing the rates of service provided to other customers seeking concurrent Internet access.

It might be possible to increase the capacity of the links 119 and/or the hubs 121; however, this tends to increase the carrier's recurring costs and often makes the overall service(s) of the ADN network economically impractical.

It has also been suggested to provide customers guaranteed quality of services for some portion of their communications, by segregating the traffic carried between the customer premises and the hub 121. This would require assigning a plurality of ATM permanent virtual circuits (PVCs) to each subscriber, one for each different guaranteed level of quality of service and one for all other Internet traffic for the subscriber. Administration and provisioning of one virtual circuit per subscriber is already complicated, and the number of virtual circuits through any given ATM node is limited by current equipment designs. Expanding the number of permanent virtual circuits per subscriber to support multiple QoS tiers of service therefore would be quite expensive, and the management thereof would become a nightmare. To support an increased number of virtual circuits, many having guaranteed QoS requiring some substantial minimum rate at all times, would also require that the operator substantially upgrade the network to increase the end-to-end capacity all the way to the wide area network 132.

Furthermore, to actually receive the desired QoS requires that all elements involved in the communication must guarantee the desired level or quality of service. For communications across the public Internet 132, this means that various nodes and links on the public Internet must be available and capable of providing a guarantee of the desired QoS. In point of fact, few nodes on the public Internet actually support any type of QoS. Hence, even if the ADN supported a desired QoS, most subscribers would not benefit from that service because their communications over the public Internet would have no QoS guarantee, and would suffer from the usual problems of latency and jitter.

Consequently, current deployments of ADSL-based data networks, such as shown in FIGS. 9 and 10, generate many customer complaints. From the customer perspective, the service does not consistently deliver the data rates for which the customer pays. The customer typically blames such problems on network equipment failure. In fact, most of the problems already are due to virtual circuit congestion problems, of the kinds outlined above. Essentially, the ADN network is crippled by the unpredictable nature of the service levels that the customers perceive due to congestion on the ADN and on the public Internet.

Any comprehensive approach to improving the ADN service also must provide adequate operational support. In particular, existing systems do not provide an adequate technique to monitor and/or test operations at various points in the ADN effecting a particular customer's service. Hence, if a customer complains about slow service or excessive data loss, the carrier operating the ADN has difficulty isolating and correcting the problem in a timely fashion. In many cases, the congestion may be outside of the ADN, but the carrier can not test to recognize such a condition because the congestion may clear before a technician can manually connect to and test the customer's circuit.

More specifically, in existing implementations of the ADSL data network, customers complain when they can not communicate at the speeds that they expect. They may complain to their ISP, or they may complain directly to the carrier providing the permanent virtual circuit (PVC) to the ISP. Typically, the customers and the ISP blame the carrier. In the present network, the carrier can obtain only limited information as to the quality of network operations and potential problem points in the network. Also, in many cases, the problem may be transitory in nature and either less severe or alleviated entirely by the time that the carrier actually can look into the problem.

To illustrate these difficulties, consider the network of FIG. 1I as a representative example. The network is generally the same as that of FIGS. 9 and 10, except that FIG. 11 identifies congestion points (CPs) and shows limited test equipment.

As noted, the customer's PVC extends to the gateway router 125. The router 125 implements a bridge group, of which the customer PVC and the ISP PVC are members. The bridge group bridges the customer's PVC to the PVC going to the router 131 of the selected ISP. The bridge group includes the MAC address of the ISP router 131. To send packet for the Internet, for example, the user terminal sends an Ethernet frame with the MAC address of the ISP router 131, and the router 125 bridges the ATM cells for that packet from the PVC of the customer to the PVC of the ISP.

In the ADN network, congestion can occur on the subscriber's DSL link to the DSLAM 111, therefore this link forms a first congestion point CP #1. Congestion can occur at point CP #2, which is the DS3 carrying the customer's PVC between the ADN switch 123 and the DSLAM 111. Congestion point CP #3 is the OC3 or OC12 between the ADN switch 123 and the gateway router 125. The gateway router 125 has certain limitations, for example, on the processing capacity of its CPU. Those limitations may create a still further point CP #4 for possible congestion in the ADN network. The ISP defined PVC from the gateway router 125 to the ISP router 131 may be congested, as shown by congestion point CP #5. In fact, the congestion may be in the ISP network or the Internet itself, so that the ISP router 131 would appear as a congestion point CP #6, from the perspective of the customer and the ADN network.

When a customer complains of slow traffic or no-traffic, the problem may be at any one or more of these congestion points CP. In the present systems, the carrier operating the ADN network has little or no way to look at the network traffic in real-time to isolate the different points and the associated causes of such troubles.

The carrier may operate a throughput server 133 associated with the gateway router 125. In a test operation, the technician re-binds the customer's PVC from the bridge group for the ISP service, so that the PVC will pass through the throughput server 133.

From the server 133, it is then possible to perform upstream and downstream rate-flow testing for communications to and from the customer's device 215. The server 133 also can test the rate-flow for communications of the customer going to and from the ISP router 131. These rate-flow tests provide some information at the time of the test; however, the test only can take place after a technician manually reconfigures the bridge group of the gateway router 125 to couple the server to the relevant PVC(s). In many instances, the carrier can not dispatch a technician to perform this manual operation and enable the testing for several days after the complaint. Consequently, at the time of the test, the conditions in the network may have changed considerably from those that actually caused the congestion for which the customer complained.

Also, the tests provide general rate information for the entire span from the server 133 to the opposite end, either the end user device 215 or the ISP router 131. Even if the test toward the CPE device 215 shows a congestion, it will not isolate the point CP #1, CP #2 or CP #3 that is actually congested. Similarly, the test toward the ISP router can not distinguish between congestion at the different points CP #4, CP #5 and CP #6.

As shown by the above discussion, the limited testing available today relies on a reconfiguration of the logical connections of the PVCs to insert the throughput server. As such, the testing is limited to the layer-2 visibility of the network, that is to say the ATM layer used to define the PVC through the ADN network.

Another area of problems is that the ADN does not offer the carrier any technique for offering its own differentiated service applications. To compete with other service providers, the carrier operating the ADSL-based data network needs to introduce its own multimedia services, for example, its own video services to compete with video services of cable television companies (that offer competing Internet access services). As noted above, however, introduction of a new service, such as true video on demand or broadcast video requires communications via the public Internet 132. This is true even if the carrier operating the network of FIGS. 9 and 10 wanted to initiate its own video service(s).

Hence, there is an ongoing need to improve the architecture and operation of a digital subscriber line data communication network, particularly to facilitate finer gradation of services within the local network. The need, first, is for such a local network to support introduction of services on a 'vertical' basis within the local access network separate and apart from the common forms of Internet traffic, both for commercial differentiation and for increased security. In a related need, the local network needs to support a number of different levels of quality of service (QoS). Any enhancement to the network must include enhancement to the associated operations support systems, particularly for monitoring and testing. Hence, there is an associated need for a technique to provide automated isolation and testing of the various segments of the network that may effect a subscriber's service.

SUMMARY OF THE INVENTION

A general objective of the invention is to implement an enhanced digital communication network for subscriber lines that supports vertical introduction of new communication and/or multimedia services.

A further objective is to support multiple levels or grades of quality of service within the access network.

Another objective of the invention relates to improvement of the cost effectiveness of the data network, for example, by reducing the demand for high-capacity interoffice links while increasing the bandwidth available at the network edge for at least some types of services.

A related objective is to provide a technique for introduction of new high-end services near the network edge, from a domain that is more secure and therefore less subject to hacker attacks.

A further objective of the invention is to support QoS and/or local introduction of vertical services, without the need to assign multiple virtual circuits or the like to each subscriber.

Still further objectives of the invention relate to operational support for provision of service through an access data network. Specifically, one objective relating to operational support is to enable an automated diagnosis of the network operations, which will enable a timely isolation and analysis of all of the points of the network that may be subject to interruptions or congestion.

A further objective of the preferred embodiment is to enable the customer to use an interactive communication to initiate the automated diagnosis operation and see the results, virtually in real time.

Another objective is for the diagnosis technique to enable the customer to initiate the process and then will provide detailed information to the customer and to the carrier as to the location and degree of the actual network problems. The diagnosis procedure preferably will produce a trouble report or ticket for use by carrier personnel to work-on and fix actual problems.

Aspects of the invention relate to unique methods and network architectures for providing a combination of wide area internetwork service and vertical communication services via a local access network. Other aspects of the invention relate to a particular switch developed to facilitate a unique form of routing, for example to support of QoS and vertical service insertion.

The preferred embodiments alleviate the above noted problems by providing an intermediate node, typically an enhanced switch, to segregate upstream traffic based on analysis of the type of communication. This analysis utilizes protocol information contained in each communication, for a protocol higher than the switching protocol, that is to say higher than a protocol used to define the customer's logical circuit. In an implementation utilizing ATM, for example, the logical circuit is a virtual circuit, and the node examines the protocol information for layers above the ATM layer. One type of traffic remains on the virtual circuit, whereas other traffic is handed off to a local services domain, typically a domain for vertical services and for network operations and related network services. The node also provides a point to aggregate traffic from the local services domain with other traffic on the subscriber's logical circuit, for transport to the customer premises equipment.

To this end, the preferred embodiments use an ATM switch having routing/processing capabilities at the higher layer, for example at the layer-3 protocol or above, in close proximity to a DLSAM. The links between the DSLAM and this switch can be of any desired high capacity because they are short and therefore relatively low in cost. Consequently, the DSLAM and the new ATM switch can support relatively high bandwidth from that node to the customer premises. To utilize the increased bandwidth and support new services, the modems on the opposite ends of the digital subscriber line negotiate and operate at the maximum rate that the line conditions will permit.

The ATM switch essentially subdivides the traffic associated with each subscriber line. One branch goes to a gateway router and hence to one or more ISP(s) at the rate corresponding to the Internet access subscription. It may be helpful to consider this as long distance or wide area traffic for the subscriber. The other branch is for local traffic, to and from the locally connected vertical services domain and/or the network services domain. The interconnection to the vertical services domain supports QoS and introduction of vertical services not easily provided from the public Internet, such as video on demand, multicasting, and voice over IP. The vertical services domain is relatively secure since it is not accessible from the public Internet.

In operation, the access network will still support a logical circuit in the form of a virtual circuit to the gateway router for each customer, for example in the form of an ATM permanent virtual circuit. That circuit is provisioned for the subscriber's desired grade or quality of Internet access service. The subscriber line, however, supports at least the same and often a higher rate service, for example via rate-adaptive ADSL communication over a twisted wire line. In the upstream direction, the ATM switch examines at least one aspect of each data transmission relating to a logically higher level of protocol, e.g. in a layer 2 protocol encapsulated in ATM, or at layer 3, layer 4, or higher. From the higher level information, the switch determines the type of transmission and segregates the upstream transmissions on the subscriber's virtual circuit. One type of transmission continues on the virtual circuit, e.g. for Internet transport. Any and all other types, however, go to the local service domains. In the downstream direction, the ATM switch aggregates any communications coming from the local service domains together with downstream transmissions on the virtual circuit from the Internet.

The local services domain also represents a communication network. The local services domain, however, preferably takes the form of a data network optimized for local transport of vertically injected services, that is to say local data traffic. In view of its local nature, it is easier and more cost effective to provide high bandwidth services. The vertical services network, for example, could take the form of a giga-bit Ethernet type local area network. Also, it is easier to adapt the vertical services network to support service level agreements with customers with regard to quality of service. In many cases, it actually is sufficient to support QoS on the one hop through the ATM switch, itself.

To support the QoS requirements, a feature of the preferred embodiments involves certain queuing and tagging operations within the ATM switch. Essentially, the switch will maintain two or more queues for each permanent virtual circuit. The switch distinguishes the queues based on importance. As the switch receives cell transmissions for transport over the virtual circuit to the customer premises, the switch will internally tag each cell as to its importance level and place the cell in the appropriate queue. The switch may implement any one of a number of different algorithms to select and transmit cells from the various queues. The particular algorithm is selected to implement QoS in conformance with the subscriber's service level agreement with the carrier and/or agreements between the carrier and the vertical services providers.

Within the one virtual circuit assigned to the individual subscriber, the invention actually provides multiple tiers of service, preferably with multiple levels of QoS. Also, at different sections along the virtual circuit "pipe," the network provides different levels of rate shaping. All layers and all services are available at the home, but different services receive different treatments in the network conforming to the different levels of QoS. The inventive approach, however, does not require each subscriber to have multiple virtual circuits.

Services provided on the vertical services domain or the network services domain appear as IP data services. Virtually any communication service may utilize the vertical services network and through it to gain access to the carrier's local customer base, simply by providing an IP interface for coupling to the vertical services network. For example, it is a simple matter to connect any digital source of broadcast audio or video information, such as a direct satellite broadcast receiver system similar to those used today in residential applications, through an IP interface. Such a broadcast source and interface can provide the full range of received video services, over the vertical services network. The access data network may distribute the video programming to a number of access switches within a local geographic area. The switch provides an optimum point for frame or cell replication for multicasting services. Hence, in our video example, the switch replicates and distributes frames for the broadcast service over the digital subscriber line circuits to customers desiring to view the programming.

Another aspect of the present invention encompasses a method for customer-centric monitoring and testing of the elements of the network. Essentially, this entails isolation of communication through segments of the network and visibility of communications on the isolated segment at protocol layers at or above the layer 2 protocol used to define the customer's connectivity. When so isolated, it is possible to run tests to determine connectivity, congestion and throughput with respect to each segment as it is isolated.

For example, in an access data network of the class exemplified above, the inventive methodology enables assessment and reporting of operations of the access data network with regard to a service provided to the customer premises equipment of an identified customer. The method comprises conducting an interactive session between a user terminal and a server coupled to the local services network, to initiate assessment. The user terminal, for example, may be equipment of the customer or a terminal for use by technical personnel. In response to the interactive session, the method automatically determines at least one state of the access data network in relation to provision of the service to customer premises equipment of the identified customer. Information regarding the determined state of the access data network is communicated to the user terminal, for presentation to the user.

The illustrated embodiments utilize a web server to provide the user interface, for the customers and/or technical personnel. The preferred embodiments utilize one or more test applications, which may run on the same server or separate servers or CPE equipment. An illustrated embodiment utilizes a web server coupled to a vertical services segment of the local services network and a test application running in a test server coupled to a network services segment of the local services network. The test server may itself perform a throughput test. Alternatively, the test server may activate other servers to run throughput tests and/or query various network elements to obtain general "health" and performance metric information regarding the customer's access service.

Software entities extant in a localized network service domain coordinate the processes that will automatically interact with the user and/or with the carrier's technical personnel to initiate the testing and provide real-time test results.

A further aspect of invention relates to the unique software for implementing the automated isolation, testing and monitoring of connectivity, congestion and throughput. A software product, in accord with this aspect, includes at least one machine readable medium and programming code, carried by the medium. In the preferred embodiment, the code actually includes several applications, at least one of which runs on a server in the vertical services domain and at least one of which runs on a client computer. The client computer may be a technician's unit operating from the vertical services domain or elsewhere, or may be an emulation thereof running on the server itself. In at least one embodiment, the client application runs on a customer's machine. As such, these applications may reside in separate media and run on two or more computers or other network nodes, although the inventive concept encompasses operation from a single, common machine.

A computer readable medium, as used herein, may be any physical element or carrier wave, which can bear instructions or code for performing a sequence of steps in a machine readable form. Examples of physical forms of such media include floppy disks, flexible disks, hard disks, magnetic tape, any other magnetic medium, a CD-ROM, any other optical medium, a RAM, a ROM, a PROM, an EPROM, a FLASH-EPROM, any other memory chip or cartridge, as well as media bearing the software in a scannable format. A carrier wave type of medium is any type of signal that may carry digital information representative of the instructions or code for performing the sequence of steps. Such a carrier wave may be received via a wireline or fiber-optic network, via a modem, or as a radio-frequency or infrared signal, or any other type of signal which a computer or the like may receive and decode.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

FIG. 8A is a combination block diagram and flow-chart illustrating the steps of an example of the automated isolation and testing procedure.

FIG. 8B is a combination block diagram and flow-chart illustrating the steps of a modified portion of the automated isolation and testing procedure of FIG. 8A.

FIG. 9 a block diagram of a prior art asymmetrical digital subscriber line data network.

FIG. 10 is a slightly modified functional block diagram of the prior art network illustrating the protocol stacks used in the various network elements.

FIG. 11 is a modified functional block diagram of the prior art network illustrating the points typically subject to congestion and the limited existing capability to test throughput in such a network.

DETAILED DESCRIPTION OF THE PRESENTLY PREFERRED EMBODIMENTS

Figure 1:
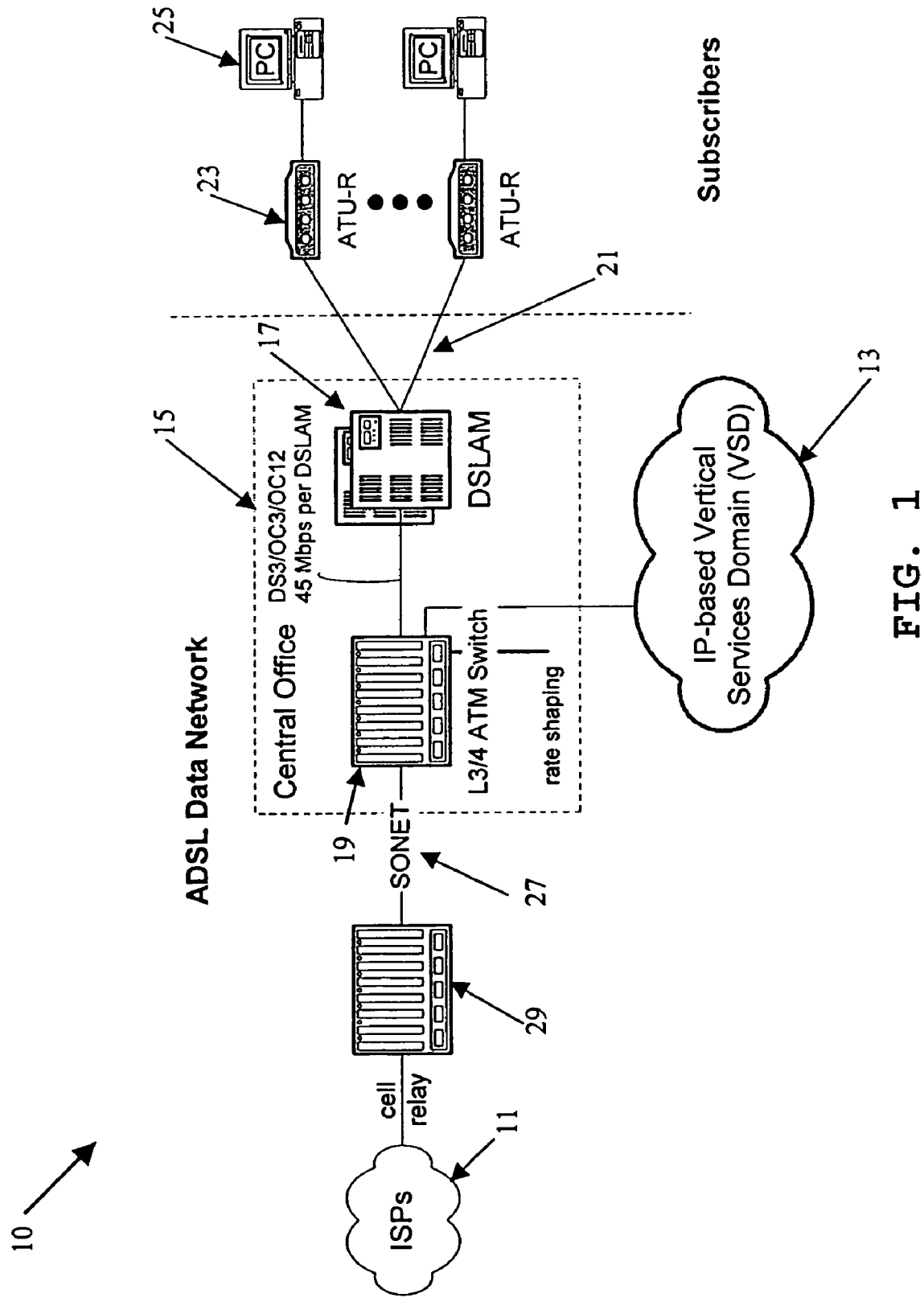
FIG. 1 is a functional block diagram of a digital subscriber line data network supporting enhanced services in accord with the inventive concepts.

The inventive network architecture introduces QoS into the ADN, in a manner that enables the delivery of sophisticated and demanding IP-based services to subscribers. The architecture does not affect existing Internet tiers of service such that the promised rates for such access appear the same as offered today. Also, the new architecture is cost-effective in terms of initial costs, build-out, and ongoing operations. The architecture utilizes an access switch or router capable of examining and selectively forwarding packets based on a relatively higher layer of the protocol stack, that is to say based on information encapsulated within the layer-2 information utilized as the lowest level definition of connectivity through the network. The access switch enables segregation of upstream traffic by communication type and downstream aggregation of wide area traffic together with traffic from a local services domain for vertical services and/or network operation support services.

In accord with the invention, the access switch examines the higher-level protocol information in the upstream communications to segregate traffic into two or more streams based on traffic type. A logical circuit provisioned for the subscriber extends from the customer premises through the switch to a node providing service to the packet switched network, typically on the Internet. The provisioning of this circuit defines a contiguous connectivity for the logical circuit, in the layer-2 protocol utilized by the network. Higher level protocols ride within this particular layer-2 protocol, including some protocols that are often considered themselves to be layer-2 protocols.

The analysis of upstream packets to determine higher-level type enables segregation of the upstream traffic into two or more upstream flows. For example, this allows the switch in the preferred embodiment to keep traffic bound for the packet switched internetwork on the logical circuit but route all other traffic onto another network, in this case a local network for vertical services and/or network operation support services. In the preferred embodiment, from the access switch or router to the packet switched network, the provisioning for the logical circuit limits the rate(s) of communication to those defined by the grade of service to which the customer subscribes. From the customer premises to the switch, however, the communications run at the optimum rates that the facilities can physically support, e.g. the maximum rates that the ADSL modems or the like can adaptively establish for the particular subscriber's line.

In the downstream direction, the switch aggregates traffic for each subscriber. The switch receives the rate-limited traffic from the packet switched network, on the subscriber's logical circuit. The switch also receives any downstream traffic intended for the subscriber, from the local or vertical services network. The switch combines this traffic and sends the combined communications downstream over the subscriber's logical circuit to the customer premises, at the optimum downstream rate that the subscriber's facilities can support.

Figure 2:
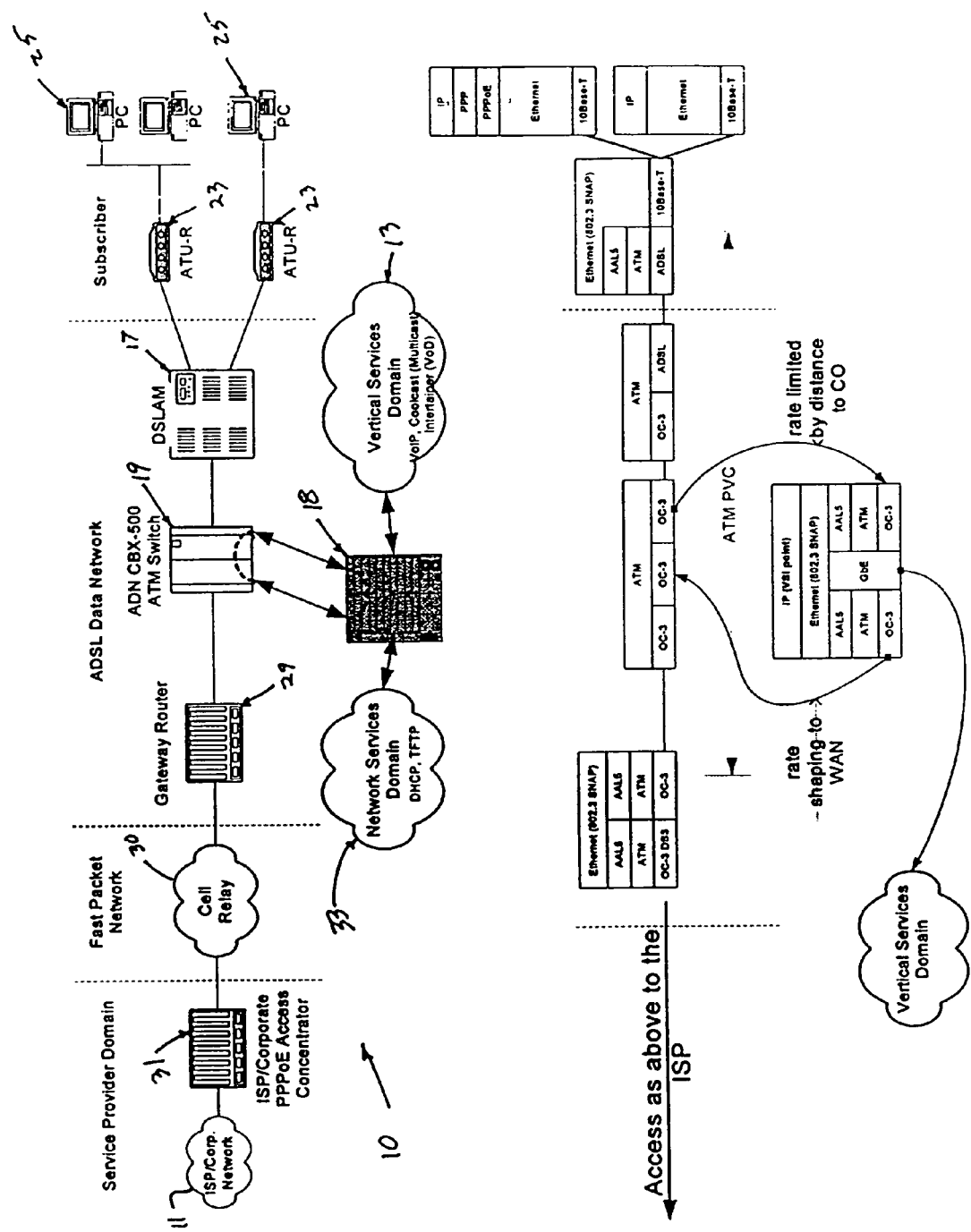
FIG. 2 is a slightly modified functional block diagram of network of FIG. 1, illustrating the protocol stacks used in the various network elements.

FIG. 1 provides a high-level functional illustration of an exemplary digital subscriber line network, specifically an ADSL data network 10, implementing the various concepts of the present invention. FIG. 2 provides an alternative functional illustration of the elements of such a network. Of particular note, FIG. 2 shows the various protocol stacks associated with the appropriate network elements that utilize those stacks. The end-user may be a single PC user or a small business or a residential LAN user. The data equipment of such users typically includes servers and PCs and may include a variety of other devices, such as fax machines, televisions, recorders and remote controlled appliances, having data communication capabilities.

The customer access link comprises an xDSL twisted pair, although those skilled in the art will recognize that the invention is readily adaptable to networks using other types of links to the subscriber premises. In the illustrated embodiment, the network 10 supports ADSL, which the carrier may offer in grades supporting 640 kbps, 1.6 Mbps or 7.1 Mbps (downstream) rates for Internet access. The actual communications over the DSL loops, however, run adaptively at the maximum rates that the line conditions allow.

The ADSL-based local access data network or "ADN" 10 provides access to two different network domains for communication services. The two network domains are logically separate. In most implementations, the first domain may be considered as a long distance or wide area domain, whereas the second domain is a local network domain. In the illustrated example, the ADN 10 provides access to a first domain in the form of a wide area internetwork, such as the public Internet, corporate local area networks (LANs), and the like, represented by the network cloud 11 for the ISPs. The high speeds available through the local network 10 enable a wide range of communications, for example, of text data, of video data, for multimedia, for web browsing, of transfers of files, for database searching, and the like via the network(s) 11.

In accord with the invention, the ADSL-based local access network 10 also offers access to a wide variety of other IP-based services through a local data network 13 serving as the vertical services domain (VSD). The vertical services typically are high-end services requiring certain QoS levels and often having a certain local characteristic. Examples of the vertical services are discussed in more detail later. Associated vertical services also include a range of operation support services relating to the ADN, particularly monitoring and testing services.

The vertical services network offers an efficient domain from which the carrier can locally inject high-end services and/or services of other local providers. The vertical services network also offers an effective point of visibility into the ADN, for performance assessment and quality assurance. Because the vertical services domain is separate from the public subject to attacks directly from the public Internet.

As shown in FIGS. 1 and 2, a central office (CO) 15 comprises one or more DSLAMs 17 and L3/4 ATM switch 19. Elements of the CO 15 providing plain old telephone service (POTS) have been omitted for simplicity of illustration, since they are generally similar to those shown in FIG. 9.

The switch 19 is designated as an "L3/4" switch here as a matter of convenience, to illustrate that the switch 19 has the capability to make selective packet forwarding decisions based on protocol information at some level that is above the L2 level that the switch normally utilizes to define or establish logical circuit connectivity. It will be recognized, however, that some of the protocols, although higher than the ATM type level 2 protocol used by the preferred switch are themselves often thought of as level 2 protocols even though they are above or encapsulated in the ATM type level 2 information. Also, decisions as to the selective forwarding may be made in response to monitoring of any level of the protocol stack above the L2 level that the switch normally utilizes to define or establish logical circuit connectivity, for example from any level above ATM all the way up to the L7 application layer.

Returning to the discussion of FIGS. 1 and 2, for purposes of this discussion, assume that the equipment at the various customer premises connect directly to the CO 15 via twisted pair type copper wiring 21. In an actual implementation, many customers may connect through such wiring to a remote terminal linked to the CO 15 via optical fiber. Other hardwired, optical or wireless implementations of the digital subscriber lines are discussed later. In the illustrated embodiment, each line 21 from a customer premises connects to an ATU-C within one of the DSLAMs 17.

On the customer premises side, the digital subscriber line circuit 21 connects to an ADSL terminal unit (remote) or ATU-R 23. The ATU-R 23 is a modulator/demodulator (modem) for communicating over a twisted wire pair type line 21, in accord with the ADSL protocols. The ATU-R in turn connects to customer premises equipment, shown by way of example as a PC 25 at each location (FIGS. 1 and 2). Those skilled in the art will recognize that the customer premises equipment 25 may include a wide range of other types of devices having data communications capabilities (see e.g., FIG. 3).

The ADSL user's normal telephone equipment (not shown) also connects to the line 21, either directly or through a frequency combiner/splitter, which often is incorporated in the ATU-R. The normal telephone signals are split off at both ends of the line and processed in the normal manner.

For digital data communication purposes, the ATU-C and ATU-R modem units create at least two logical channels in the frequency spectrum above that used for the normal telephone traffic. One of these channels is a medium speed duplex channel; the other is a high-speed downstream only channel. Such modems may implement either one of two techniques for dividing the usable bandwidth of the telephone line to provide these channels. One approach is to divide the usable bandwidth of a twisted wire pair telephone line by frequency, that is to say by Frequency Division Multiplexing (FDM). The other approach uses Echo Cancellation. FDM uses one frequency band for upstream data and another frequency band for downstream data. The downstream path is then divided by time division multiplexing signals into one or more high-speed channels and one or more low speed channels. The upstream path also may be time-division multiplexed into corresponding low speed channels. With echo Cancellation, the upstream band and downstream band substantially over-lap. The modems separate the upstream and downstream signals by means of local echo cancellors, in a manner similar to that used in V.32 and V.34 modems.

The DSL modems may use a number of different modulation techniques to physically transport digital data streams. A number of implementations of the modems have used carrierless amplitude phase (CAP) modulation. Most current xDSL modems, however, utilize a discrete multi-tone (DMT) approach.

Returning to the discussion of the CO 11, the structure and operation of each DSLAM 17 is essentially the same as those of the DSLAM 111 in the embodiment of FIG. 9, except that the control functionality of the DSLAM 17 is somewhat different. The DSLAM 17 controls the ATU-Cs to implement a rate-adaptive ADSL service, to adapt operations so as to maximize data rates for the communications over the individual subscriber lines. Essentially, the ATU-Cs and ATU-Rs signal each other over the lines to synchronize their modes of operation at parameter settings, which achieve optimum data throughput. Also, the DSLAM 17 does not need to monitor or limit the line rates, but instead relies on the rate-adaptive control algorithm to maximize the rates achieved over the ADSL circuits or provide rate-shaping for the ATM virtual circuits. Other network elements limit rates, where necessary.

The L3/4 ATM switch 19 is co-located with the DSLAMs 17, within one central office 15. As a result, it is practical to connect the multiplexer within each of the DSLAMs 17 over a high-speed data link directly to an appropriate port of the ATM switch 19. Because these links are short, there is little or no cost imposed when implementing such links using wideband equipment. By itself, the co-location of the L3/4 ATM switch 19 with the DSLAM(s) 17 does not increase bandwidth. Rather, it makes increased bandwidth at the network edge economically feasible, due to proximity. Co-location removes the requirement to purchase expensive wide area transport (the SONET ring) to increase bandwidth. In particular, the direct OC3/OC12 connections between the DSLAM 17 and the L3/4 ATM switch 19 do not incur any recurring tariff expenses.

The ATM switch 19 connects through a SONET ring 27 to a gateway router 29 providing ATM transport through a cell relay network 30 (FIG. 2) to the ISPs shown at network 11 in the drawings. Most of the ISPs will utilize a concentrator or other equipment as their point of presence for Internet access (FIG. 2). In the preferred embodiment, the equipment 31 provides a point-to-point protocol (PPP) interface designed for transport over Ethernet (PPPoE). The ATM switch 19 also provides a connection to the local implementation of the VSD network 13, for example via a giga-bit Ethernet port to a switch or other local network elements 18.

The illustrated local access type ADN network 10 provides ATM cell transport from the customer premises to the ISP network(s) 11. The ATM cells serve as the layer-2 protocol for defining contiguous switched connectivity. Higher level routing protocols, such as Ethernet and TCP/IP frames, ride within the ATM cells. Services of different types utilize different protocols at one or more layers above the ATM cell layer. In the preferred embodiments, all communications utilize Ethernet. However, communications to and from the ISPs use the noted PPPoE type Ethernet protocol. In contrast, communications to and from the vertical services domain use one or more of the other Ethertype protocols.

To efficiently provide cell relay, each customer is assigned a virtual circuit that extends from the ATU-R 23 in the respective customer premises to the gateway router 29. This logical circuit is defined at the layer-2 protocol level. The present implementations implement this logical communication circuit as an ATM permanent virtual circuit, although the inventive concepts may apply to other types of logical circuits or channels.

The gateway router 29 is the communication node of the access network 10 providing access to the wide area IP packet networks, of corporations or more often of Internet Service providers. The gateway router 29 terminates permanent virtual circuits through the cell relay network 30, from the equipment 31 of each such wide area packet network provider 11. The gateway router 29 also terminates the permanent virtual circuits from the subscribers through the data network 10. For communication with a selected ISP network 11, for example, the gateway router 29 routes cells from the permanent virtual circuit from the subscriber through to the permanent virtual circuit of the selected ISP network 11. In the opposite direction, the gateway router 29 routes cells from the permanent virtual circuit from the selected ISP network 11 through to the permanent virtual circuit of the particular subscriber.

For the leg of the subscriber's logical circuit, extending from the L3/4 ATM switch 19 through the gateway router 29, the carrier programs one or more nodes along the path behind the DSLAMs 17, to regulate traffic on the virtual circuit to the rate corresponding to the grade of Internet access service to which the particular customer subscribes. In the preferred embodiment, at least one such node performing this rate shaping function is the L3/4 ATM switch 19. All traffic going to and from the ISP network(s) 11 therefore is still limited to the rates defined in the service level agreement (SLA) for Internet access that the carrier has with the particular customer.

The portion of the virtual circuit extending between the ATM switch 19 and the ATU-R 23, however, is not rate limited but instead runs at the maximum rate that the line will support using the rate-adaptive ADSL modem operation. In most cases, the rate-adaptive ADSL modem operation will support rates substantially higher than the subscription rate for Internet access service.

The L3/4 ATM switch 19 also provides the interconnection to the subscriber's virtual circuit for insertion of downstream traffic from the vertical services domain 13 and separation of upstream traffic from the subscriber's virtual circuit going to the vertical services domain 13. In accord with the invention, decisions as to whether upstream traffic is destined for the vertical services domain 13 or should remain on the subscriber's virtual circuit going through the gateway router 29 and the cell relay network 30 to the ISPs 11 is based on an analysis of traffic type. The traffic type analysis relies on protocol information contained in the communications, which relates to layers of the protocol stack that are higher than the layer-2 switching protocol, in this case above the ATM layer.

As shown in FIG. 2, traffic destined for an ISP 11 utilizes a variation of a point to point protocol (PPP) intended to run on top of Ethernet, referred to as PPP over Ethernet or "PPPoE." A 'type' indicator contained within the Ethernet frames identifies the PPPoE protocol. In contrast, traffic going to and from the vertical services domain utilizes other 'types' of Ethernet protocol. All traffic to and from the customer premises uses Ethernet frames carried within ATM cells.

The switch 19 therefore routes a subscriber's traffic going to and from an ISP 11, upon detection of the PPPoE indicator in the level 3 data contained within the Ethernet cells. This traffic will also utilize public IP addressing. In contrast, the ATM switch 19 routes a subscriber's traffic going to and from the vertical services domain, upon detection of any other type of Ethernet protocol at level 3 or above in the protocol stack. The IP addressing in the vertical services domain 13 utilizes private-IP addresses, for example, as administered with a DHCP server (not shown) coupled to the network cloud 33. Although shown separately, the cloud 33 may be implemented as a portion of the network providing the physical elements of the vertical services domain. The portion 33, however, would typically be a logically separate domain that the carrier controls and restricts for its own network administration use.

Figure 3:
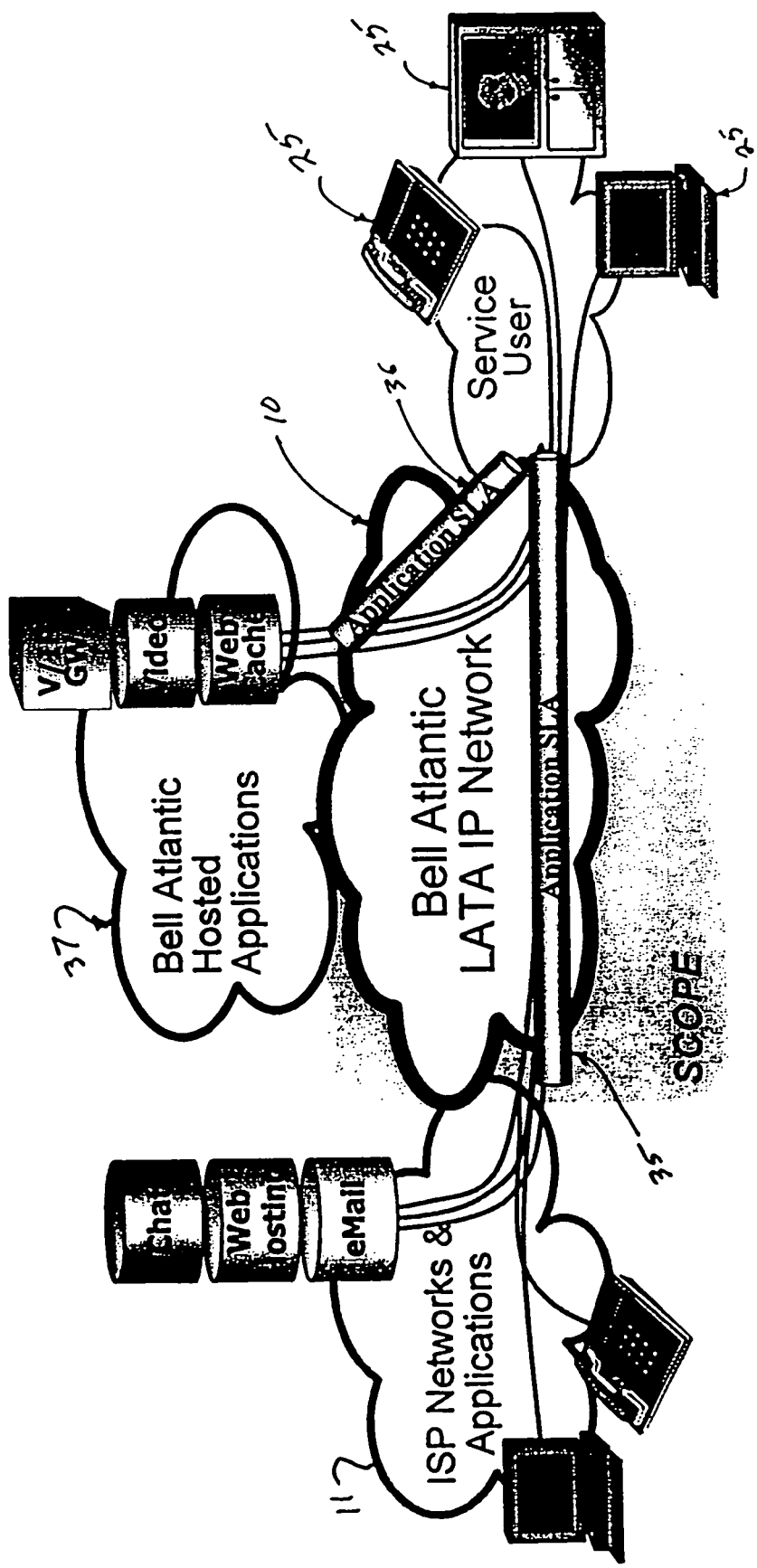
FIG. 3 is a functional block diagram of the network showing the service level agreements (SLAs) for which the network provides appropriate QoS.

FIG. 3 depicts the logical division of the subscriber's traffic, as implemented at the ATM switch 19 in accord with the invention. As shown, the network 10 provides a logical "pipe" or circuit 35 extending to the networks 11 of one or more of the ISPs, for an Internet access application. The ATM switch 19 (FIG. 1) preferably performs a rate shaping or control function. The leg 35 of the subscriber's traffic extending to the ISP 11 provides upstream and downstream communication rates conforming to a service level agreement (SLA) applicable to the subscriber's Internet access application. As such, the communications over the subscriber's logical circuit, extending from the switch to the ISP, provide a first level of QoS. To the subscriber, service over the leg 35 appears the same as a subscriber selected grade of Internet access service as provided by older ADN architectures. FIG. 3 illustrates chat rooms, web surfing and e-mail as examples of services an ISP might offer through the Internet Application SLA circuit 35 and the attendant portion of the subscriber's assigned logical circuit through the access network.

The network 10 also supports communications over one or more logical application paths 36 to local applications 37 hosted in the vertical services domain. Assuming that a subscriber with various equipment 25 also subscribes or otherwise participates in one or more of the vertical services, the local carrier (e.g. Bell Atlantic in FIG. 3) offers a corresponding number of additional application SLAs with the customer. Each SLA for a vertical service may specify QoS parameters for the particular application, such as rate/bandwidth, latency, jitter, packet loss, packet sequence, security and/or availability. Examples of such applications hosted in the carrier's vertical services domain 37 include the illustrated voice over IP service shown as a V/IP gateway, as well as video services and some caching for high volume local web services. Communications for such applications utilize the one or more paths 36.

The network of FIGS. 1 to 3 also supports closed or private user work groups or virtual local area networks (VLANs). VLANs, for example, may be implemented as a service hosted through the vertical services network 13. All traffic from customer premises belonging to one of the VLANs would include a VLAN Ethertype indicator. Since the frames would not be PPPoE type Ethernet frames, the switch 19 would route the upstream transmission to the vertical services network 13. VLAN frames also carry a VLAN identifier. The nodes of the network 13 transport the packets for the VLAN members only to resources that are members of the identified VLAN. In this manner, the capability exists for creating logical workgroups of users and their shared resources (servers, printers, etc.), that may be physically separated from each other. VLAN groupings can provide privacy and security to their members while enabling "broadcast domains" whereby broadcast traffic is kept logically "inside" the VLAN.

The present invention also supports segregation and aggregation of traffic for three or more domains, based on the higher-level traffic type analysis. An alternative implementation for closed user group services therefore might actually provide a third domain for such services. PPPoE traffic would go to the concentrator equipment 31, as discussed above. The switch 19 would route the upstream transmission frames bearing a VLAN Ethertype indicator to the alternate network serving as the VLAN service domain. That domain would process VLAN communications essentially as done in a normal switched Ethernet type network.

Upstream transmissions that bear any other type of Ethertype indicator would go to the vertical services network 13, as in the earlier examples.

A feature of the switch, in accord with the invention, is that it prioritizes traffic for each customer to support QoS for the various services as required by service level agreements (SLAs) between the customer and the carrier. In this regard, one implementation of the L3/4 ATM switch 19 performs queuing and tagging operations in accord with the desired prioritization. The switch will maintain two or more queues for each subscriber's permanent virtual circuit. The switch distinguishes the queues based on importance or priority. As the switch receives cell transmissions for transport over the virtual circuit to the customer premises, the switch will internally tag each cell as to its importance level and place each cell in the appropriate queue based on the tag.

The tagging and prioritization may be based on traffic type or 'Type of Service' (ToS). Table 1 illustrates one example of the possible ToS levels that may be assigned to different communications.

TABLE 1

| Relative Priority | ToS Value | AR Queuing | Customer Traffic Encapsulated TOS | Internal BA Mgmt Traffic Rewritten TOS |
|---|---|---|---|---|
| Critical Management | 0 | WFQ (Control 25%) | | OSPF, SNMP, ICMP, BGP |
| Future | 1 | | | |
| Real Time Interactive | 2 | WFQ (High 40%) | Port numbers identified | |
| IP Application Control | 3 | WFQ (Medium 30%) | ICMP, IGMP, EGP, DNS, H.323 signaling, BGP, SIP, Microsoft Media Player Streaming Media Control, RTSP | IGMP, RADIUS |
| One Way Streaming Media | 4 | | UDP (ports 1024+) | |
| One Way Batch | 5 | | HTTP, HTTPS, SNMP, Telnet | |
| Unknown | 6 | WFQ (Low 5%) | Other | Other |
| Non time sensitive | 7 | | FTP, TFTP, SMTP | |

The access switch 19 will examine the content of each communication and determine an appropriate ToS level, for example in accord with the table above. Based on the ToS level, the switch will add a tag to the cell(s) as part of its internal processing. Using the ToS tags, the switch will place each of the cells for a given subscriber into a corresponding one of a plurality of queues that the switch maintains for the subscriber's traffic.

The switch may implement any one of a number of different queue servicing algorithms to select and transmit cells from the various queues. For example, the switch 19 may implement one of several statistical algorithms, equal queuing, weighted queuing, priority selection from queues, etc. The particular algorithm is selected to implement QoS in conformance with the subscriber's service level agreements (SLAs) with the carrier. In most cases, particularly for service applications from the vertical services domain, the switch 19 will not normally drop any cells or packets. In the rare event that the switch 19 becomes congested, any dropping of cells is based on the priority level assigned to the frame, i.e., lowest priority first. Also, if the switch ever drops cells, it drops all cells for an effected lowest priority frame from the relevant queue.

The ability to prioritize traffic across the inserted streams and the PPPoE stream enables the operator to control flows through the ADN 10 so that the local access facility is not overwhelmed with content which exceeds its physical (rate adaptive) limitations. For example, the queuing rules preferably ensure that the 'proper' applications (based on insertion device based rules) obtain access to the limited rate adaptive bandwidth available on any given subscriber's line. Also, the insertion point, switch 19, will usually sit behind the media conversion point (e.g., the DSLAM 17). An OC3 or other facility between the switch 19 and the DSLAM 17 also could become congested. Preferably, the switch 19 or other element at the insertion point queues the traffic in such a manner that no downstream facility (OC3) limitations (which are independent of the rate adaptive DSL loop limitations) will result in packets being dropped.

The queuing will be done based on customer and network provider determined rules so that contention for the facilities facing the subscriber will be addressed via the dropping of the appropriate packets. That way an inserted video stream doesn't overwhelm a PPPoE or voice stream (due to facility limitations). Among others, appropriate industry understood methods for accomplishing this queuing control include Weighted Fair Queuing (WFQ), Priority Queuing (PQ), and Weighted Random Early Discard (WRED).

Also, the ability of the switch 19 to examine higher level information provides other advantages in network operations. For example, the switch can implement sophisticated filters on the higher level information, e.g., to provide security. As another example, the switch preferably performs measuring and monitoring to determine what if any packets get dropped (based on the physical rate adaptive limitations), and generates appropriate reports to an external operations system (not shown).

The introduction of the L3/4 ATM switch 19 in proximity to the DSLAM(s) 17 also provides benefits in terms of operation of the gateway router 29. Due to the end-to-end use of the Unspecified Bit Rate (UBR) PVCs, the gateway router interface to the cell relay network 30 has been engineered to support a maximum of 2000–4000 PVCs (end users). This is essentially an over-provisioning of bandwidth that probabilistically avoids service degradation that could result from simultaneous demand for bandwidth. The ability of the L3/4 ATM switch 19 to perform QoS and rate shaping essentially reduces or ever removes this concern, because it significantly reduces the risk that the gateway router 29 will become a bottleneck. As a result, the ADN 10 can increase bandwidth efficiencies for this interface. Further, the capacity through the gateway router 29 need not be upgraded as often to support demand for increased bandwidth associated with new bandwidth-intensive services, since many such services are now introduced through the vertical services domain 13 and the L3/4 ATM switch 19.

Figure 4:
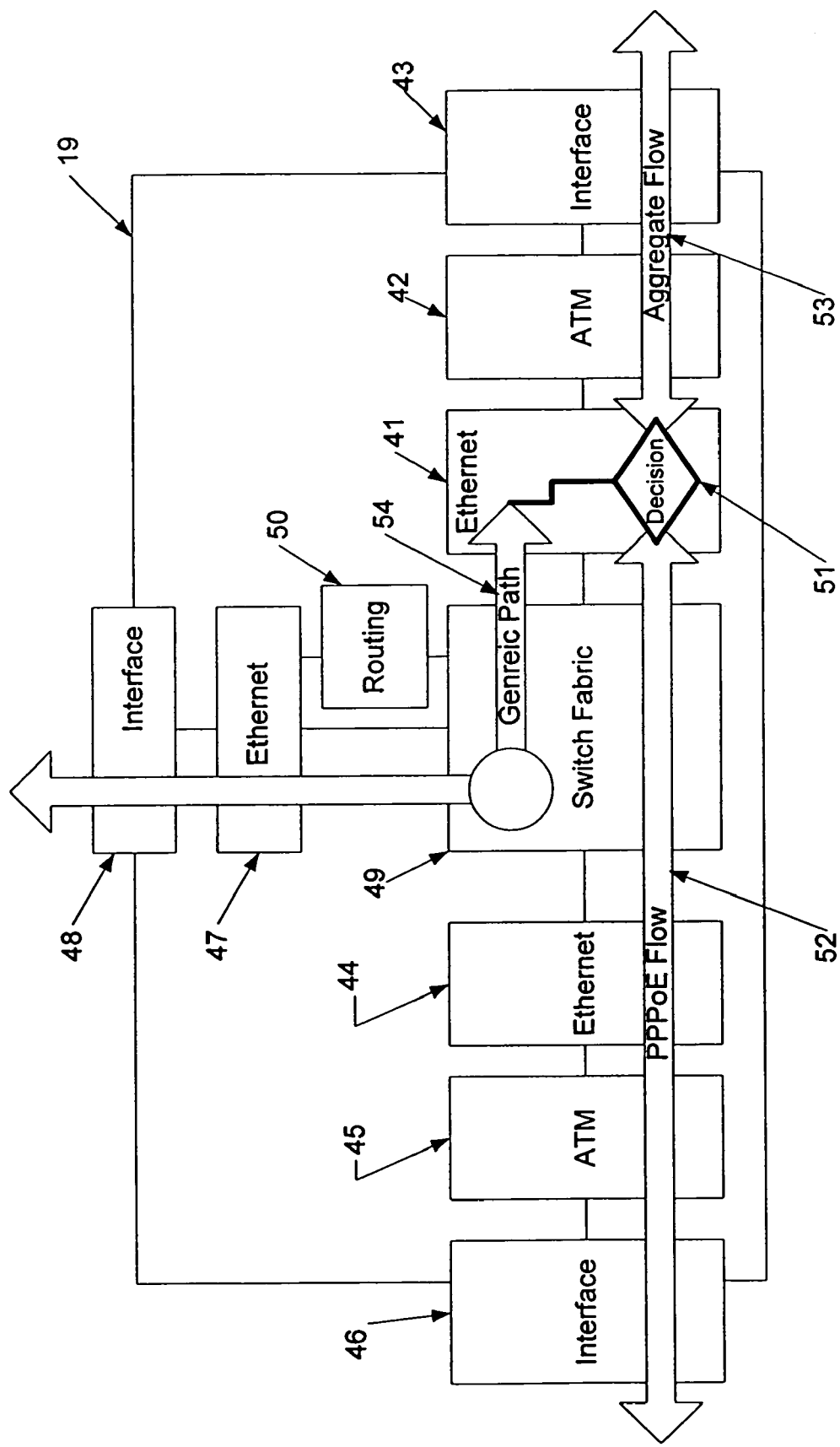
FIG. 4 is a logical diagram of the functional elements of an L3/4 switch, for use in the inventive network of FIGS. 1–3.

To fully understand an exemplary implementation of the various inventive concepts, it may be helpful to consider an ATM-based embodiment of the L3/4 switch 19. FIG. 4 is a block diagram of the elements and functions of such a preferred embodiment of the switch 19.

The preferred embodiments utilize Ethernet framing. As shown in the drawing, the switch 19 includes an Ethernet interface 41, an ATM interface 42 and an associated physical interface 43 facing toward the subscribers. In an embodiment for use in the network of FIGS. 1 and 2, the physical interface might take the form of one or more OC-3 or OC-12 links to the DSLAMs 17. These links carry all ATM cell traffic going to and from the DSLAMs and hence to and from the customer equipment served through the particular switch 19.

The switch 19 also includes an Ethernet interface 44, an ATM interface 45 and associated physical interface 46 facing toward the gateway router 29 and hence the ISPs 11. The physical interface 46 might take the form of one or more OC-12 or OC-48 links to the gateway router 29. These links carry all ATM cell traffic going to and from the ISPs or other wide area inter-networks 11. For these communications, the Ethernet interface 44 passes through PPPoE traffic, as specified by the Ethertype indicator in the cells transporting the relevant frame segments.

Facing the vertical services domain, the switch 19 includes an Ethernet interface 47 and a physical interface 48. These interfaces conform to the particular network utilized by the carrier for the vertical services domain, such as giga-bit Ethernet over wire or optical links.

The switch fabric 49 performs the physical switching of data along various paths through the switch 19, in response to instructions from a programmed routing controller 50. FIG. 4 also shows the communications flow through the switch, for each subscriber. The switch 19 also implements a Decision Point 51, shown for example within the Ethernet interface processing 41 on the subscriber facing side. At that point, the PPPoE traffic is separated from all other traffic. From that point, the PPPoE Flow 52 for each subscriber extends as a portion of the subscriber's ATM virtual circuit, facing the cell relay network and hence the ISPs 11. The PPPoE Flow 52 contains Ethernet frames that are of PPPoE Ethertype. Facing towards the subscriber premises, the switch 19 implements an Aggregate Flow path 53, in the form of another portion of the ATM virtual circuit, which contains all ingress/egress subscriber traffic. The switch implements a Generic Path 54 extending through the interfaces to the vertical services network. This path 54 carries all traffic other than PPPoE.

In this example, the switch 19 implements the decision point 51 based on recognition of the Ethertype indicator, which is above the layer-2 ATM cell routing information. However, the switch may implement the decision point 51 based on still higher-level protocol information. Also, those skilled in the art will recognize that the concepts of the invention are applicable in networks using different protocol stacks, for example based on native IP.

In a preferred embodiment, the Ethernet and ATM interfaces 41 and 42 and the Ethernet and ATM interfaces 44 and 45 implement segmentation and reassemble (SAR) functions, essentially providing two-way conversions between ATM cell format and Ethernet frame format. Segmentation involves dividing an Ethernet frame into a number of 48-byte blocks and adding ATM headers to the blocks to form a corresponding number of ATM cells. Any blocks that do not include a complete 48-byte payload are padded as necessary. Reassembly entails receiving and buffering ATM cells until it is recognized that a complete frame has been received. The ATM headers of the cells and any padding are stripped, and the payload data is reassembled into the form of an Ethernet frame.

In such an embodiment of the switch 19, the decision point 51 determines how to selectively forward the Ethernet frame information taken from a particular series of upstream ATM cells based on the Ethernet information taken from the ATM cell payloads, for example, by examining the frame header and recognizing the particular Ethertype indicator. Internally, the actual switch fabric 49 for such an embodiment of the switch 19 would comprise an Ethernet switch, even though to other elements of the ADN network 10 the switch 19 appears to perform an ATM switching function.

Those skilled in the art will recognize however, that the decision and switch fabric may be implemented in other ways. For example, a series of cells corresponding to an Ethernet frame could be buffered and the payloads examined just to recognize and identify the Ethertype indicator, without a complete reassemble of the Ethernet frame. This later implementation therefore could utilize an ATM cell-based switch fabric. Also, the decision may distinguish traffic types based on other higher level protocol elements, such as TCP/UDP or IP.

From the discussion above, it should already be apparent that certain aspects of the invention relate to setting up logical communication circuits at a relatively low protocol layer corresponding to switching or routing functions and then segregating traffic by distinguishing communication type using higher level protocol information. To insure full understanding on these points, it may be helpful to consider the protocol layer definitions, with particular reference to the illustration of the preferred layers in FIG. 2. The International Standards Organization (ISO) Open Systems Interconnection (OSI) reference model specifies a hierarchy of protocol layers and defines the function of each layer in the network.

The lowest layer defined by the OSI model is the physical layer (L1). This layer provides transmission of raw data bits over the physical communication channel through the particular network. For example, on the subscriber lines in the preferred embodiment, the physical layer (L1) uses ADSL. Within the customer premises, communications use an Ethernet physical layer (L1), such as 10Base-T. Upstream network elements may use DS3 at some points, but most use SONET, for example OC-3 or OC-12 physical layer transport. Attention is directed to the lower half of the diagram in FIG. 2, which depicts the various protocol stacks throughout the network 10.

The layer defined by the OSI model next to the physical layer is the data link layer (L2). The data link layer transforms the physical layer, which interfaces directly with the channel medium, into a communication link that appears error-free to the next layer above, known as the network layer (L3). The data link layer performs such functions as structuring data into packets or frames, and attaching control information to the packets or frames, such as checksums for error detection, and packet numbers. In the network 10, the data link layer (L2) is used to define certain switching functions through the network. The network layer (L3) provides capabilities required to control connections between end systems through the network, e.g., set-up and tear-down of connections.

The preferred embodiments utilize ATM cell transport as the lowest element of the data link layer (L2), for example to define the connectivity extending from the ATU-Rs 23 through the ADN network 10 to the ISP or corporate networks 11. Subscriber virtual circuits are provisioned at the ATM cell layer, that is to say at the data link layer (L2). Similarly ISP virtual circuits are provisioned at this ATM data link layer (L2), from the gateway router 29 through the cell relay network 30 to the ISP access concentrators 31. The ATM protocol therefore is the layer-2 (L2) protocol used to define the logical connectivity from the subscriber premises to the gateway router 29. The ATM protocol also is the layer-2 (L2) protocol used to define the logical connectivity from the gateway router 29 to the ISP concentrators 31.

For purposes of this discussion, higher level protocols are protocols that ride on or are encapsulated within the particular layer-2 protocol, that is to say in the payloads of the ATM cells in the preferred embodiment. Such higher level protocols include some protocols, which are often considered themselves to be level-2 protocols, where they are transported within ATM cells. The preferred embodiments use Ethernet, a local area network protocol above the ATM portion of the L2 layer. Technically, the Ethernet protocol may be considered as another L2 layer protocol. However, because it is segmented and encapsulated into the payloads of the ATM cells, the Ethernet protocol information actually is a higher level protocol information above the specific level-2 protocol (ATM) that defines the normal connectivity through the ADN network 10.

In the OSI model, a transport layer protocol (L4) runs above the network layer. The transport layer provides control of data transfer between end systems. Above the transport layer, a session layer (L5) is responsible for establishing and managing communication between presentation entities. For example, the session layer determines which entity communicates at a given time and establishes any necessary synchronization between the entities. Above the session layer, a presentation layer (L6) serves to represent information transferred between applications in a manner that preserves its meaning (semantics) while resolving differences in the actual representation (syntax). A protocol (L7) that is specific to the actual application that utilizes the information communicated runs at the top of the protocol stack.

In accord with one inventive concept, the network 10 actually utilizes two or more different types of protocol at levels above the protocol within the L2 layer that actually defines the network connectivity. The ADN network 10 may use different protocols at the higher layers as well. By distinguishing transmissions based on differences in these higher-level protocol types, the ATM switch 19 separately forwards different types of communication traffic for each subscriber. In the preferred embodiment, communications to and from the ISP or corporate networks 11 utilize point-to-point protocol (PPP) as the network layer (L3) protocol and a shim for transport of PPP over Ethernet (PPPoE). PPPoE, as one Ethertype protocol could also be considered as a second layer (L2) protocol albeit above the Ethernet layer itself, which in turn rides on the ATM cells used for routing at least through the permanent virtual circuit at the L2 layer.

In the illustrated implementation, however, the use of the PPPoE or a different protocol actually is an indication of a difference in type of the higher layer protocols. In the illustrated example of FIG. 2, the vertical services domain traffic utilizes Ethernet (802.3 SNAP) above the ATM adaptation layer (AAL). As noted, the presently preferred L3/4 switch 19 implements its routing decision based on recognition of the Ethertype indicator, that is to say to distinguish the PPPoE traffic from all other types of transmission from the customers' data equipment. In view of the use of ATM as the data link layer (L2) protocol of the network defining the lowest layer of network connectivity for communications services through the ADN network 10, the discrimination based on Ethernet actually implements a decision based on an effectively higher protocol layer.

IP protocol carries the actual higher-level applications information, for transport to and from the vertical services domain and for transport to and from the wide area internetwork. As such, IP and its related transport protocol referred to as the "Transmission Control Protocol" (TCP) ride on top of (are actually encapsulated within) the lower level protocol elements discussed above. Presentation and application layer elements ride on top of the IP layer. IP communication requires that each user device have an assigned IP address. IP addresses, however, are a scarce commodity. Because of the use of IP transport for both wide area services and vertical domain services, the network 10 actually may at times assign two different IP addresses to each active data communication device of an end-user, albeit on a temporary basis. The wide area communications and the vertical services network may also be viewed as two separate 'broadcast' domains.

First, the carrier operating the ADSL data network 10 and the vertical services domain network 13 will maintain a pool of local addresses for assignment, on an as-needed basis, to end user equipment 25. To the carrier, the available IP addresses are a limited resource. Accordingly, the carrier assigns IP addresses on a dynamic basis, only to those users actually on-line at any given time. The carrier preferably utilizes private network type IP addresses and dynamically administers such addresses using dynamic host configuration protocol (DHCP). DHCP is a protocol for automatic TCP/IP configuration, which enables dynamic address allocation and management.

When a particular device 25 becomes active via the ATU-R 23 and the DSLAM 17, it will activate a basic protocol stack, including an IP portion enabling communication with a DHCP server. The device will transmit an address request upstream through the network on the subscriber's virtual circuit. At the Ethernet level, this transmission appears as a broadcast message. The L3/4 ATM switch 19, however, will recognize that the packet is not a PPPoE communication and route the cells carrying the packet into the vertical services domain 13. Typically, a DHCP server is coupled to the vertical services domain network 13, for example as part of the carrier's administrative network or systems 33. The DHCP server somewhere on the vertical services domain 13, 33 will answer that broadcast request by selecting and providing an available one of the private IP addresses from the carrier's pool of available addresses. The message with the assigned address will go back to the L3/4 ATM switch 19 for insertion into the virtual circuit and transport back to the requesting device 25.

The particular end-user's device 25 uses the assigned private IP address as its source address, for all of its communications with the vertical services network 13, so long as it remains on-line for the present session. When the overall session ends and the end-user device 25 goes completely off-line, the DHCP server returns the private IP address to its pool of available addresses, for reassignment to another user as the next user comes on-line.

As noted, the user equipment 25 receives a private IP address from the DHCP server. The addresses of services on the vertical services domain also are private IP networks. Because these addresses are private, they are accessible only to equipment within that domain and the data network 10. Consequently, the devices are not accessible to hackers or the like coming in through the public Internet.

This dynamic assignment of IP addresses allows the carrier to limit the number of IP addresses used to the number of users actively connected through the ISP's host to the Internet. The use of private IP addresses allows the user equipment to communicate with the vertical services domain utilizing a normal IP-Ethernet protocol stack.

For the as-desired Internet access service, for example using a PPP or similar protocol, IP addresses are administered through the ISPs. The PPPoE protocol preserves or emulates the traditional dial-up approach to ISP access. However, the PPPoE approach does utilize Ethernet and follows Ethernet standards, for example, involving processing of certain broadcast messages.

The user can select an ISP of choice, and her data equipment 25 will initiate a selective session through the Ethernet layer on the network 10 to access the equipment 31 of the selected ISP network 11, in a manner directly analogous to a dial-up modem call through an ordinary telephone network. Hence at a time after initial activation through the networks 10 and 13, the user may activate a browser or other program for using the wide area internetwork service. This activates a second protocol stack, which includes the PPP protocol and the PPPoE shim. The user selects an ISP, and the data equipment initiates communication through the network 10 to the PPPoE equipment 31 of that ISP.

The IP addresses used by each ISP are public network type IP addresses. To the ISP, the pool of available public IP addresses also is a limited resource. Accordingly, each ISP prefers to assign IP addresses on a dynamic basis, only to those users actually on-line at any given time. Typically, as part of each initial access operation for a PPPoE session, the user's equipment 25 and the PPP terminating equipment 31 of the ISP conduct a handshaking, to establish data communications therebetween. As part of this operation, the user's device transmits a broadcast request for a public IP network. The broadcast message, in PPPoE goes through the virtual circuit to the gateway router 29 and through the router and cell relay network 30 to the ISPs PPPoE equipment 31. Although it is a broadcast message, the network effectively limits transport thereof to the virtual circuit going to the ISPs PPPoE equipment 31, that is to a domain separate from the vertical services network domain 13.

The ISP host equipment 31 initiates a procedure to assign the user's computer 25 a numeric Internet Protocol (IP) address from the pool of available public addresses and sends a PPPoE message containing that address back to the subscriber's device 25. When the session ends and the user goes off-line, the ISP host can reassign the address to another user, as the next user comes on-line.

This dynamic assignment of IP addresses allows the ISP to limit the number of public IP addresses used to the number of users actively connected through the ISP's host to the Internet. The end-user equipment will implement a second protocol stack, carrying PPPoE communications. The PPP protocol will allow the end-user equipment to obtain and utilize the public IP address for communications going to and from the public internetwork.

The switch 19 will limit transport of other types of PPPoE broadcast messages to the link to the PPPoE concentrator 31, in a manner similar to that described above for the PPPoE address request. The switch 19 also limits transport of non-PPPoE broadcast messages to the vertical services domain network 131, both for the address request message and for other types of broadcast requests. As such, the logical circuit to the PPPoE concentrator 31 becomes the conduit to one broadcast domain for upstream PPPoE messages; and the vertical services network 13 defines a second broadcast domain for upstream messages of other Ethertypes.

As noted, the end-user equipment 25 will implement two protocol stacks, a native stack without PPPoE and a second stack with PPPoE and a shim. In actual operation, both the native stack with other Ethernet protocols and the wide area stack with PPP and the PPPoE shim often will be active at the same time. The software in the data equipment 25 will utilize one stack or the other depending on whether the user selected a link, e.g. a URL, relating to the wide area internetwork or the vertical services domain. For example, a browser may display a page with embedded links. If a link is to a service on the vertical services domain, the embedded address will be a private address on the vertical services domain. Selection of such a link causes the device 25 to use the native Ethernet stack (without PPP or PPPoE) and the private address. Hence the L3/4 ATM switch 19 routes the request triggered by selection of the link to the vertical services domain 13. In contrast, if the link is to a service on the public Internet or other network 11, the embedded address will be a public IP address. Selection of such a link causes the end-user device 25 to use the PPP and PPPoE stack and the public address. Hence the L3/4 ATM switch 19 routes the request triggered by selection of the link over the virtual circuits to the PPPoE equipment 31 of the currently selected access provider network 11.

Services provided on the vertical services domain therefore appear as simple IP data services, albeit using the appropriate address space. Virtually any communication service provider may access the vertical services network 13 and through it the carrier's local customer base simply by providing an IP interface for coupling appropriate equipment to the vertical services network. For example, it is a simple matter to connect a direct satellite broadcast receiver system, similar to those used today in residential applications, through an IP interface to provide the full range of received video services over the vertical services network 13. This network may distribute the video programming to a number of L3/4 ATM switches 19, within a local geographic area serviced by the ADN network 10. The L3/4 ATM switch 19 co-located with the DSLAM 17 provides an optimum point for frame or cell replication for multicasting services.

For a multicast service, such as the satellite-originated video broadcast service, the service provider sends one stream through the vertical services domain network 13 to the L3/4 ATM switch 19. The switch 19 will monitor every ATM virtual circuit going to the subscribers, looking for IGNP requests. A subscriber sends an IGNP request to join a selected multicast channel. When the L3/4 ATM switch 19 detects such a request, it identifies the requested channel and the requesting subscriber equipment and forwards a 'join' message to the vertical services domain. Subsequently, the switch 19 replicates received packets for the requested broadcast channel, and the switch drops the replicated packets into the cells for each of the virtual circuits of all of the joined subscribers, including the newly added subscriber. When the subscriber later elects to end viewing of the multicast, the subscriber's equipment sends a 'leave' message, and the switch 19 stops adding the cells for the multicast to that subscriber's virtual circuit.

In addition to vertical services, the carrier continues to provide agreed access services to the equipment of the ISPs, in a manner analogous to current practices. For example, the carrier may provide its Internet access service to a subscriber on a monthly subscription basis, at one of several available rates corresponding to the grade of internet access service (and thus the rate of communication to/from the ISP) selected by the customer's subscription.

In an enhanced service offering, the broadcast provider could offer a convenient navigation interface from a web server. The server could be on the vertical services network, but preferably is on the wide area Internet 11. With a PPPoE session active, the user can surf to the provider's server and view information about available programming. The user might select a current broadcast program by 'clicking' on a URL link in the provider's web-based information. Although provided through the wide area Internet 11, the URL would actually contain the private IP address for the desired broadcast program available from the vertical services network 13. Selection of such a URL therefore would generate a message to the appropriate server on the vertical services network 11 to initiate the above discussed procedure to allow the user to 'join' the selected broadcast. A similar methodology might also enable a provider to offer menu, selection and order/billing services from the Internet 11, to provide pay-per-view or video on-demand type services from the vertical services domain network 13.

Although IP-based, the services from the vertical services domain 13 may follow any other desirable business model. For example, a multicast service provider may contract with the carrier to provide multicast audio (radio-like) and/or video (TV-like) services via the vertical services domain. The multicast service provider, not the subscribers, would pay the carrier. The multicast service provider may offer any or all of the multicast programming to customers on some type pay-per-view basis but would likely offer most of the programming service for free or bundled in as part of some nominal monthly subscription charge. The multicast service provider instead would charge advertisers in a manner analogous to current broadcast business practices. Advertising distributed with the IP multicasting, however, can be carefully targeted at end-customers having demographic profiles meeting specific criteria specified by individual advertisers, which allows the multicast service provider to charge premium advertising rates.

Table 2 summarizes the characteristics and requirements of a number of examples of the types of vertical services that the VSD network 13 can deliver via the L3/4 ATM switch 19 and the ADSL data network 10.

TABLE 2

| Vertical Service Offering | Characteristics of the Service | Network Requirements |
|---|---|---|
| Voice Services | Local Co-Located VoIP Gateways, VoIP, Unified messaging, IP PBX, IP Centrex | Low latency, low jitter, non-correlated packet loss, and high availability |
| Video On Demand (Unicast) | Local VOD Servers or access to centralized servers. Supports whatever model of server deployment/content delivery mechanism. | High bandwidth, low jitter, high availability, and low packet loss |
| Multimedia Broadcast (Multicast) | Broadcast Video; Broadcast Audio; Satellite Down Link support; Local Servers at the edge. | Varies with content type and with multicast implementation |
| Caching Services | Local servers at the insertion point, Local delivery mechanism for generic media objects such as web pages, images, video files, audio clips, software downloads, etc. | Layer 3/4 visibility |
| Distance Learning (EVC) | Integrated interactive video, voice and data | Low latency, low jitter, non-correlated packet loss, and high availability |
| Telecommuting | Closed user group with access to Transparent LAN Service (TLS). | IEEE 802.1Q |

Figure 5:
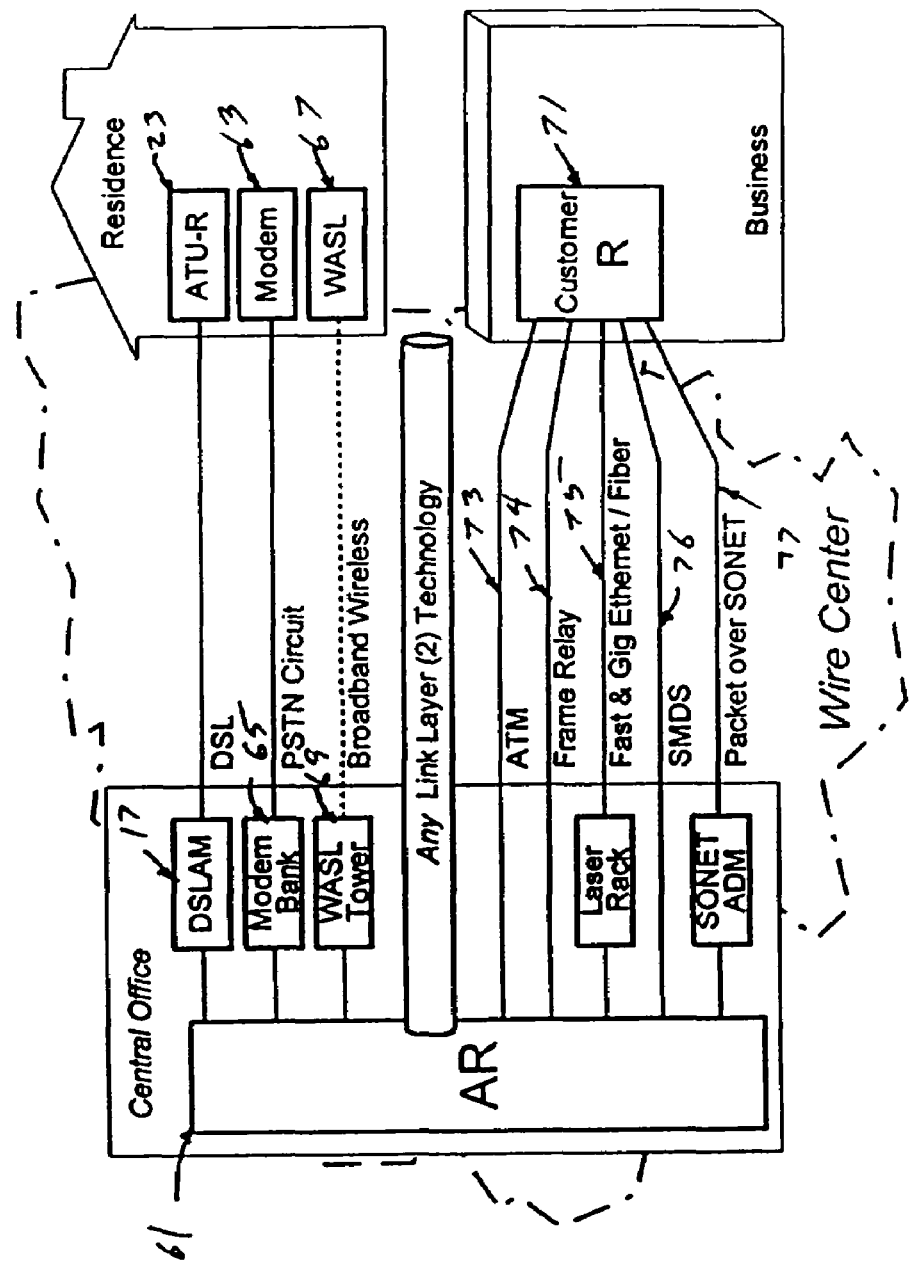
FIG. 5 is a block diagram of a modified portion of the network, useful in explaining migration to other types of physical transport and switching/routing protocols.

The above discussed preferred embodiments implemented the processing above the layer-2 protocol in an enhanced ATM switch and focused on implementation over an xDSL network specifically designed for use of twisted pair wiring to the customer premises. Those skilled in the art, however, will recognize that the principles of the present invention are equally applicable to other types of layer-1 and layer-2 transport/switching technologies as well as selection based on other protocols above the layer-2 protocol. FIG. 5, illustrates the implementation of the layer 3/4 and higher switch functionality in a generic access router (AR) 61. The illustration also teaches the provision of digital subscriber line data communication between the access router (AR) 61 and a number of customer premises, using a variety of line technologies. The digital line technologies include dial-up modems 63, 65 as well as wireless communications between wireless asymmetrical subscriber loop (WASL) transceivers 67, 69. The access router (AR) 61 can service residential customers via these other communication technologies as well as through the DSLAM 17 and the ATU-R 23 as in the earlier embodiment. The access router (AR) 61 also serves business customer router equipment 71, using a variety of fast frame/cell packet technologies 73–76 and even optical fiber (SONET) 71.

Those skilled in the art will recognize that even these examples are limited. For example, the inventive vertical services insertion techniques may apply to pure video networks, such as in a hybrid fiber-coax implementation of a CATV system with digital video service as well as cable modem service.

The access router (AR) 61 will provide one or more types of logical circuits, implemented in the appropriate layer-2 protocol(s), e.g. ATM, frame relay, etc. Although the links to the wide area internetwork and the vertical services domain have been omitted here for simplicity of illustration, the access router (AR) 61 will provide the routing functions to and from the wide area internetwork and the vertical services domain in a manner similar to the functionality of the L3/4 ATM switch 19 in the earlier embodiment. In this regard, the access router (AR) 61 will support the QoS levels and will enable local insertion of vertical services.

Figure 6:
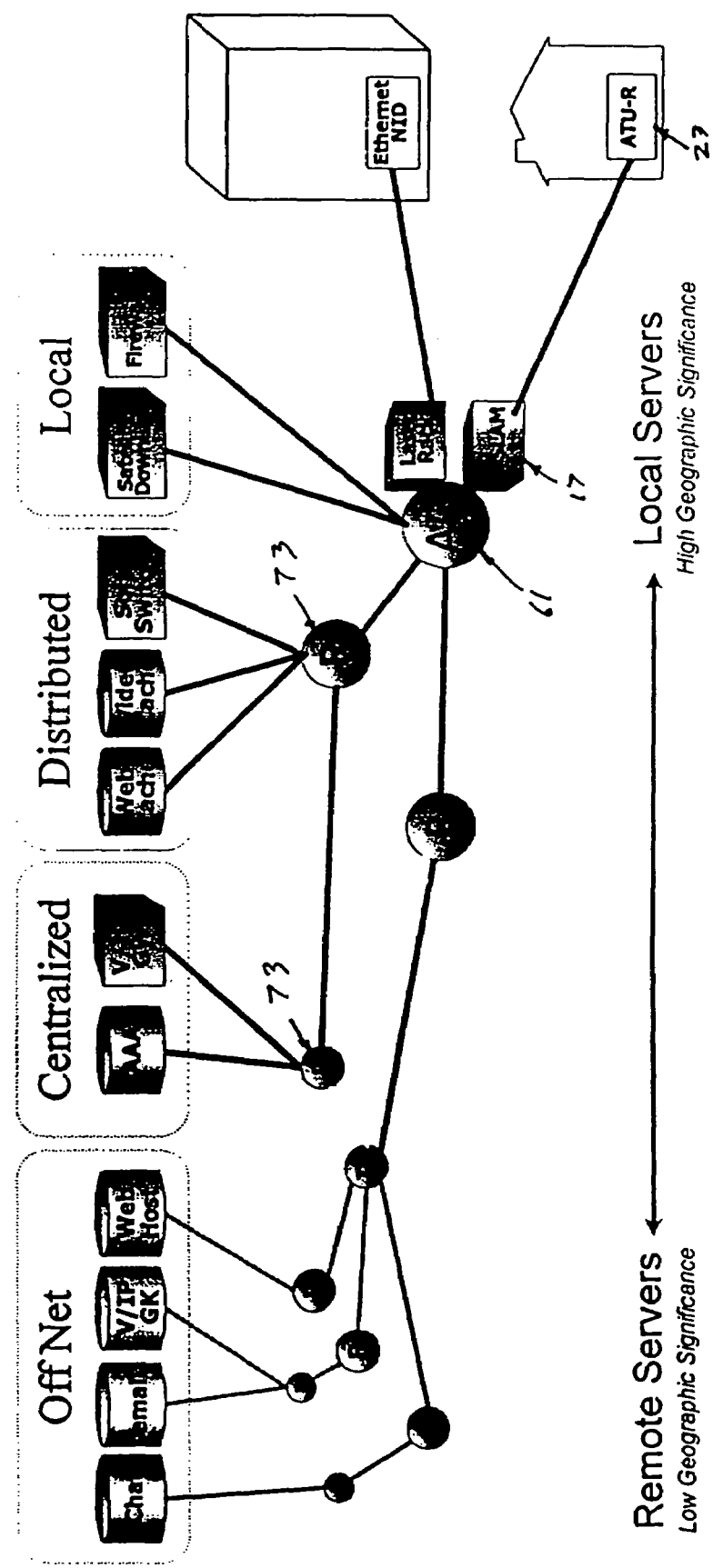
FIG. 6 is a block diagram of a portion of the network of FIG. 5, showing the interconnection thereof with the wide area network and the local vertical services domain.

FIG. 6 depicts a portion of the network of FIG. 5, showing the interconnection thereof with the wide area internetwork and the local vertical services domain. The vertical services network itself may include a number of routers (R) 73. Through that network, the access router (AR) 61 provides communications with services in the VSD that may be purely local, somewhat distributed or even centralized. True long distance data services, such as chat rooms, email and web browsing on the public Internet, however, are considered as Off-Net services, since they are accessed via the Internet access connection under the associated SLA.

Although the embodiments show a single local vertical domain and the public Internet domain through the ISPs or ISPs, the inventions encompass networks supporting even more distinct domains. For example, the different Ethertype identifiers can be used to segregate traffic into multiple domains at different points between the DSLAM and the gateway router. The PC or other CPE would determine which type to use, and a switch similar to the VSI switch 19 at the appropriate point along the PVC would segregate and aggregate the traffic according to Ethertype. In addition, the distinctions can be based on still higher types of information from the protocol stack.

Another feature of the present invention relates to a technique for customer-centric monitoring and testing of the elements of the ADN network. Essentially, this entails isolation of communication through segments of the network and visibility of communications on each isolated segment at protocol layers at or above the layer 2 protocol used to define the customer's connectivity. When so isolated, it is possible to run tests to determine connectivity, congestion and throughput with respect to each segment, as it is isolated. A related aspect of invention encompasses software for implementing the automated isolation, monitoring and testing operations.

Figure 7A:
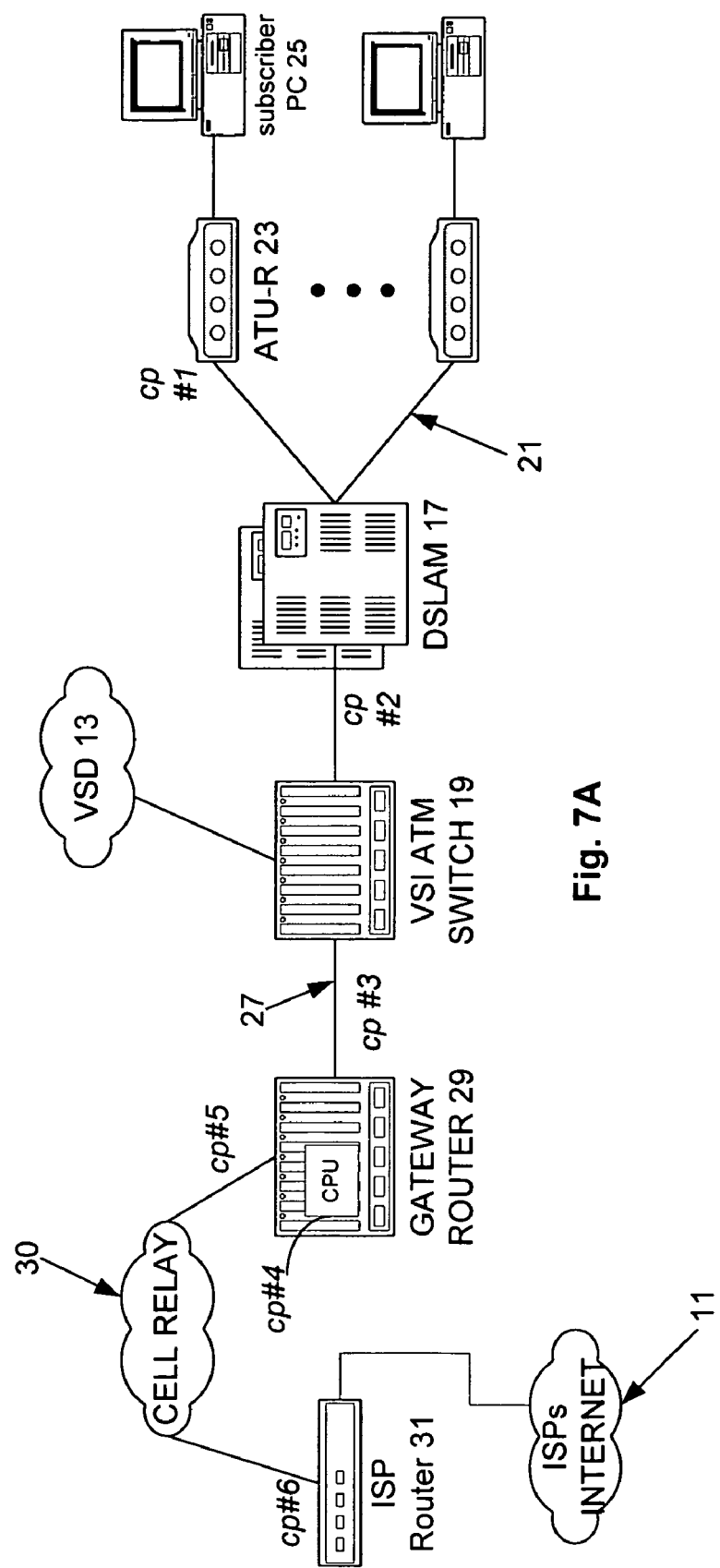
FIG. 7A is a block diagram of the network similar to those of FIGS. 1 and 2, albeit in simplified form to illustrate the points of the enhanced network that may be subject to congestion.

FIG. 7A is a block diagram of a typical ATM-backed digital subscriber line data network, overlaid with probable congestion/connectivity points (CP) that may cause a transmission to be lost, slowed, or discarded. Hence, FIG. 7A shows the elements of the enhanced ADN network, which are most likely subject to congestion and causes of customer complaints, particularly complaints as relates to the wide area Internet access services.

As in several embodiments discussed above, the user has an ATU-R modem 23 providing a data link over a line 21 to a DSLAM 17. This link is the first point CP #1 that may be a cause of trouble, either because of some form of congestion or failure. Congestion also can occur at point CP #2, which is the DS3 or other link carrying the customer's PVC between the DSLAM 17 and the VSI switch 19.

Potential congestion point CP #3 is the OC3 or OC12 serving as the link 27 between the VSI switch 19 and the gateway router 125. The VSI ATM switch 19 preferably resides at the central office 15. A SONET link 27, for example OC-12 or OC-48, connects the switch 19 to next higher-level switch or router in the network. As traffic to and from the Internet grows, even this link may become congested, particularly at peak usage times.

Typically, the SONET link 27 extends to the gateway router 29, which serves as a network hub. Those skilled in the art will recognize that there may be intermediate switches or routers, depending on the geographic area and number of customers served. In some implementations, for example, the link 27 from several central offices may extend to an ATM switch (not shown), which in turn connects to the actual link going to the router 29 serving as the gateway to the ISP networks 11. In such a case, the links between the VSI switches and the intermediate switches as well as the higher-level links to the gateway router 29 serving as the network hub present separate potential congestion points. For convenience of illustration, the drawing shows the link 27 to the gateway router 29 as a single such congestion point, CP #3.

The gateway router 29 has certain limitations, for example, on the processing capacity of its CPU. Those limitations may create a still further point CP #4 for possible congestion in the ADN network. The ISP defined PVC from the gateway router 29 to the ISP router 31 may be congested, as shown by congestion point CP #5. In fact, the congestion may be in the ISP network 11 itself, so that the ISP router 31 would appear as a congestion point CP #6, from the perspective of the customer and the ADN network.

The present invention involves isolating different sections or segments of the network for analysis and trouble-shooting, based on the higher-layer visibility provided by the network architecture as discussed in detail above.

Figure 7B:
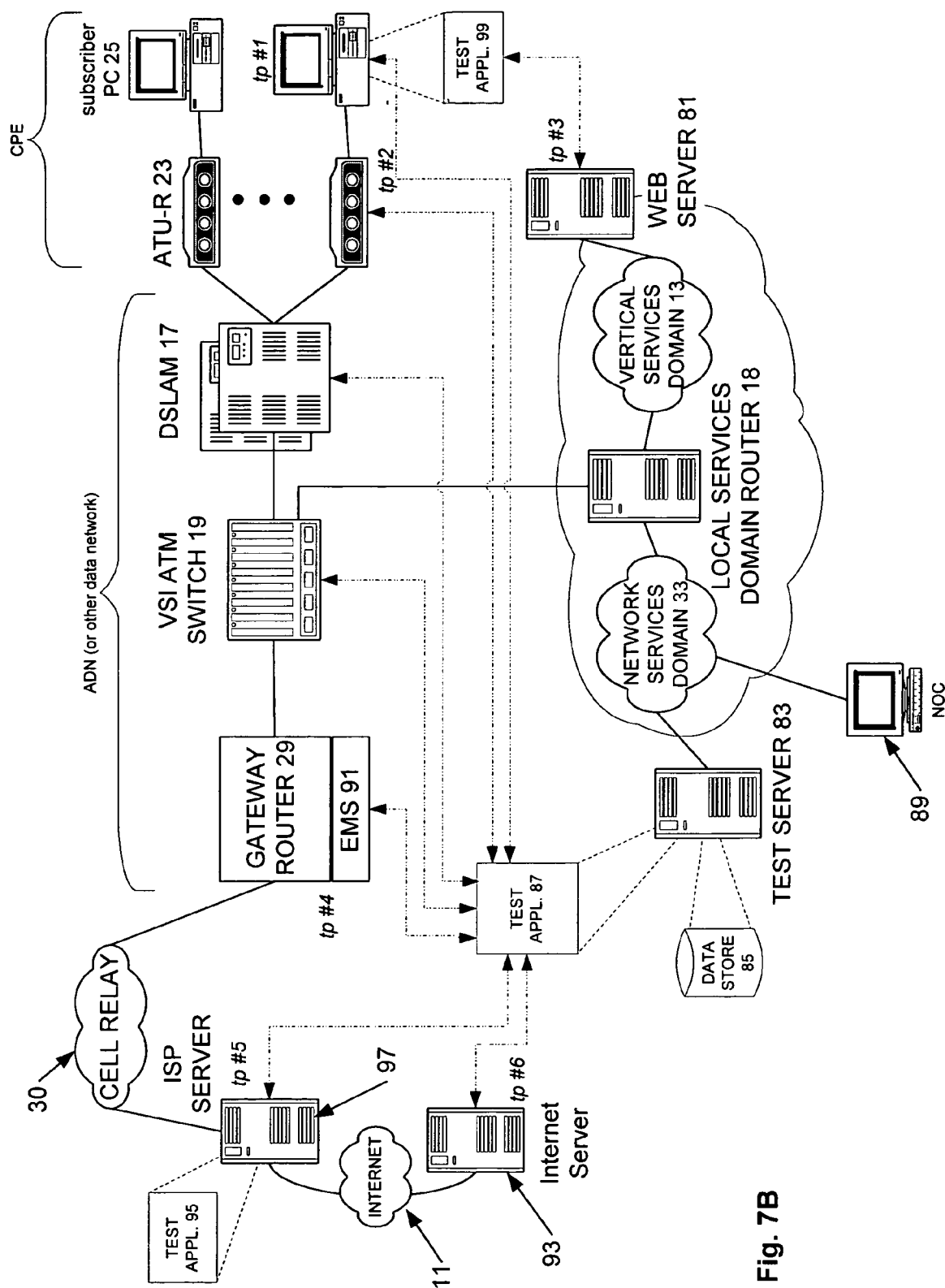
FIG. 7B is a block diagram of the network similar to those of FIGS. 1 and 2, but showing details with regard to certain elements thereof enabling an automated isolation and testing of the congestion points identified in FIG. 7A.

FIG. 7B is an enhanced block diagram of the access data network, showing certain additional elements involved in the automated isolation and testing operations. Elements of the network referenced by the same or similar numbers as shown in the earlier drawings are substantially the same as like numbered elements discussed above, for example relative to FIGS. 1 and 2. The network of FIG. 7B is arranged and provides wide area services and vertical services essentially as described above. However, certain servers are operated on the Internet or preferably within a privately controlled area or domain of the vertical services networking to enable introspective operational services (e.g. monitoring of congestion points and assessing other operational parameters) for the ADN or other data networks.

For purposes of the monitoring, surveillance and quality assurance methodology, the carrier or other party assessing network operations will operate at least one server from a local services domain. In the illustrated example, there are two such servers, specifically web server 81 and test server 83. The web server 81 provides a point of user interface accessible via standard browser software and the relatively public vertical services domain 13. The test server runs certain tests and/or coordinates tests and status reporting functions by other elements, from its location on the secure network services domain 33. In the preferred embodiment, the test server has access to a data store 85 and runs a test application 87. The data store 85 contains subscriber related information and/or information about status reports from various network elements. The operations of the servers 81, 83 for monitoring, surveillance and quality assurance purposes are available to customers from their end user equipment 25. These servers also provide a point of interface for technical personnel, for example via a workstation 89 at a network operations center (NOC).

The customer will run a standard Internet browser application, for example on a PC 25 or other appropriate data communication device. In a similar fashion, the workstation 89 may implement a browser interface, to allow technical personnel to utilize the testing and quality assurance procedures. The web server 81 and the test server 83 run one or more applications related to the test selection reporting and operations to conduct and report actual tests, as discussed in more detail below.

The preferred methodology enables a customer that is capable of receiving vertical services to use a web-based software application on PC 25 or the like to access network resources so as to initiate procedures to isolate, monitor and test various segments of the ADN network that may be adversely impacting the customer's data services. In a like manner, a technician or customer service agent of the carrier having a standard terminal 89 with access to the local services domain may use a similar web-based software application to initiate the automated monitoring and testing procedures via the servers 81 and 83. The automated interaction of the user (customer, technician, or agent) through the common web-based software application causes communications to software entities extant in one or more of the services domains, which coordinate the processes that will automatically isolate and test segments of the corresponding data circuit.

The monitoring, surveillance and quality assurance method utilizes the ability of the access switch/router, i.e. the VSI ATM switch 19 of FIG. 7B, to:

participate as a layer 2 (e.g. ATM) peer, for the purpose of performing layer 2 testing to other layer 2 elements in the network; and examine and route traffic based on layers of the protocol stack that are carried by the layer 2 data link, for the purpose of testing layer 3 through 7 connectivity, packet rate, and QoS.

Such services may monitor the network between the subscriber's computer 25 and an Internet server 93 in the wide area network 11. This method employs the local services domain 13 and/or 33, under the control of the network operator, as both a point from which to test the network, and as a logical conduit that enables the subscriber and the ISP to perform end-to-end testing. A related aspect of invention encompasses software for monitoring the operations of the access data network, as discussed more later.

The fundamental challenge addressed by such aspects of the invention is to significantly improve the ability of the subscriber, network operator, and partner ISP to assess the condition of the ADN, especially regarding ATM virtual circuits, to isolate congestion and faults in the network, and actively inspect certain resources related to network operation. This assessment must be able to be made in real-time (immediately, with no network reconfiguration required), so that the network state that is causing poor performance can be diagnosed before that state changes (possibly due to a change in traffic load for example).

Each customer terminal 25 can access the web server 81 in the same manner as any other IP-capable device or service on the vertical services domain network. Essentially, when the customer wants to conduct a test, the customer surfs to a page on the server 81, using the private IP address of that server and the non-PPPoE type Ethernet communications as described in detail above. The server 81 provides a webpage type user interface for obtaining status information, selecting specific tests and obtaining results of such tests.

The carrier also provides a test application 87, which may run on the same server 81, but in the illustrated embodiment includes one or more applications running on the separate test server 83. Certain communications, discussed later, may be exchanged between the servers 81 and 83, for example via the node 18 and physical links of the domains 33 and 13. The server running the test application, such as the test server 83, also communicates with the actual service transport elements of the access data network, such as the electronic management server (EMS) 91 associated with the gateway router 29. The server may also communicate with the DSLAMs 17 and/or the VSI switch 19. Such communications enable the server 83 to obtain status information regarding the subscriber's service and related transport services. The physical links (not shown) between the provisioning server 83 and these elements may go through secure logical channels through the network services domain 33 and the node 18 or may use other private data communication links, for example through a logically out-of-band management network. Out-of-band here refers to a channel or circuit that is logically separate from those carrying subscriber traffic, even through it may or may not utilize the same physical facilities.

As noted, the inventive monitoring, surveillance and quality assurance service also may be utilized by technicians or other personnel of the carrier via the workstation 89 at the NOC. The technician or agent operation the workstation 89 can access the web server 81. Through that user access, the technician identifies a particular user, by an appropriate address, and initiates a substantially similar procedure to utilize the test application 87 and obtain information as to the various network operations and their impact on the service to the identified customer. For purposes of discussion, the comments below will focus on the interface for the customer. However, those skilled in the art will recognize that the workstation 89 provides the carrier or ISP personnel with access to the same test procedures and results, to allow those personnel to proactively operate and maintain the ADN network.

FIG. 7B provides a block diagram of the digital subscriber line data network overlaid with the test points/paths (tp) that may be examined by the operational services. Each test point is a network element that may be a layer 2 element, or supports examination at one or more types of Layer 3 or higher for testing connectivity or congestion. The preferred technique for layer 2 testing involves the use of a test virtual circuit, injected at the VSI point.

The preferred technique for Layer 3 or higher testing involves executing several classes of tests, which may include the following:

a connectivity test, using ICMP ping (Layer 3) as the preferred embodiment; and a connectivity test for elements that cannot respond to an ICMP ping, using an operations application layer interface to a Layer 2 resource (such as an Ethernet bridge table), for example to search for the correlation of an ISP MAC address to a customer's MAC address); and a generic packet rate throughput test, using a TCP-based (Layer 4) dampened oscillation algorithm as the preferred embodiment; and an application-level (Layer 5, 6, or 7) throughput test, the preferred embodiment using HTTP, FTP, or other protocol commonly used on the Internet; and a Quality of Service (QoS) test, the preferred embodiment using a stream of packetized voice traffic in combination with other types of traffic; and a case-specific query of any relevant information, using SNMP as the preferred embodiment for network elements that support specific queries.

For each exemplary test path/point, Table 3 describes the domain of the test and identifies each type of test in which the test point may actively participate.

TABLE 3

| | Test domain | Layer 2 (data link) | Layer 3 Connectivity (ICMP) | Layer 4 Packet Rate (TCP) | User Application Throughput (HTTP, FTP, etc.) | QoS | Detailed info (SNMP) |
|---|---|---|---|---|---|---|---|
| tp#1 (PC 25) | CPE | | ✓ | ✓ | ✓ | ✓ | |
| tp#2 (ATU-R 23) | | ✓ | ✓ | ✓ | | | ✓ |
| tp#3 (local services domain) | Local services domain | ✓ | ✓ | ✓ | ✓ | ✓ | ✓ |
| tp#4 (GWR 29) | Edge of network | ✓ | ✓ | ✓ | | ✓ | ✓ |

TABLE 3-continued

| | Test domain | Layer 2 (data link) | Layer 3 Connectivity (ICMP) | Layer 4 Packet Rate (TCP) | User Application Throughput (HTTP, FTP, etc.) | QoS | Detailed info (SNMP) |
|---|---|---|---|---|---|---|---|
| tp#5 (ISP server) | ISP partner | | ✓ | ✓ | ✓ | ✓ | |
| tp#6 (Internet server) | Internet | | ✓ | ✓ | ✓ | ✓ | |

An aspect of this invention is a software application that may perform operational testing on the test points/paths. Several instances of this inventive software application may operate at different locations within the network. Each installed instance of a test application may be specialized for its position in the network, and may have specialized functionality or user interfaces. FIG. 7B also shows three exemplary installations of such software:

test application 87, installed within the local services domain, the preferred embodiment being located at a test server 83 within the network services domain 33; and test application 95, installed at a ISP server 97; and test application 99, installed at the customer premises, either as software in the subscriber's PC 25, or as firmware within the ATU-R (or like enhanced ADSL termination unit) 23.

In FIG. 7B, the dashed-dotted lines show some of the paths that the exemplary test application installations can test. Exemplary test application 87 may enable the network operator to test any point toward the ISP, through the ISP to the Internet 11, and any point toward the subscriber equipment 25. Exemplary test application 99 may enable the subscriber to test any point toward the local services domain, any point toward the ISP, and to the Internet 11. Exemplary test application 95 may enable the ISP to test any point between it and the local services domain, and any point between it and the subscriber. It is also possible that tests from all of these areas would be run concurrently, and the application in 87 or 99 would correlate the results and suggest next steps based on consistent results or discrepancies in the results.

The preferred embodiment of the test applications is a client-server software architecture, where the test application commands the locally resident applicable layer 2 though 7 services to communicate with the corresponding services resident at the test points/paths. An alternative embodiment is to deploy respective client and server test applications on each testing installation, such that the client version of the test application requests testing services from the server version of the test application.

In general, the local services domain made possible by the VSI architecture enables the exchange of higher layer metrics between the subscriber and the ISP. Within the local services domain, the web server 81 and the integrated test server 83 cooperate to enable the testing. In the preferred embodiment, the test server 83 resides in the private network services domain 33, while the web server 81 resides in the public vertical services domain 13. The web server 81 provides the public interface, to enable testing between the wide area network and the subscribers. The test server 83 may avail the web server 81 of layer 2 information, specifically the MAC-to-PVC association (in the data store 85) that may be gathered by an automatic provisioning method.

The test applications may have a graphic user interface (GUI) or command line interface (CLI) that a user may use to actively issue a test and generate reports. The test applications may store the acquired data in a manner that co-located or remote applications (e.g. a Web browser) can display related reports.

To appreciate the operation and advantages of the inventive network monitoring, surveillance and quality assurance, it may be helpful to consider a specific example of a preferred embodiment. Assume for this discussion that the service is available to the subscriber having access to vertical services. The network is essentially as in FIG. 7B, and the exchange of signals between elements is shown in the diagram of FIG. 8A.

Here, the subscriber desiring a determination of current service quality must initially access the web server 81 (S1), to obtain one or more web-pages of information (S2).

Typically, the initial routing to the web server 81 (S1) will use a domain name and associated query to obtain the address of the server 81. The domain name would be a unique textual name that the carrier has registered for the test services. A domain name server (DNS), not shown, would provide the user's PC 25 with the private IP address for a local server 81 that provides the test service through the VSD serving the actual end user's area. For example, the DNS would typically point the user's PC 25 to the web server 85 in or closely associated with the serving central office 15.

Initially, the session between a PC 25 and the web server 81 will cause the server to send back a page to the PC 25 (S2) to show the user a number of test options. The initial communication of the web page itself provides certain information, such as the fact that the network is providing connectivity through the line 21, the DSLAM 17 and the VSI switch 19 to the vertical services domain 13.

The web server 81 or the test server 83 periodically receives status information, of a general nature, from the elements of the ADN. For example, the DSLAMs 17, the VSI switches 19, any ADN switches and the gateway router(s) 29 periodically report whether or not they are operative. Wherever possible, these network elements also provide quantitative information about current performance. For example, most modern versions of the DSLAM 17 include monitoring equipment associated with the ATU-C modem cards to calculate the current throughout rates for DSL communications over the respective subscriber line 21. Preferably, the initial page provided from the web server 81 also provides a display of portions of this general information as to the "health" of the ADN network, which are relevant to the service to the particular user.

The initial operation of the web server 81 could execute a series of tests and/or related communications to determine the connectivity between points and provide a page display to the customer with regard to each of the results. Alternatively, one page could show all of the connectivity states for the customer. The first results page will offer the customer options or links to obtain throughput tests for the respective links or domains.

In the example, an initial page might show that the customer has connectivity to the web server 81, that is to say through the line, the DSLAM 17 and the VSI switch 19. As such, the page shows connectivity through points CP #1 and CP #2. The page would offer the user an option to obtain a throughput test. If the user then clicks on the appropriate link to chose a throughput test, the PC 25 transmits the appropriate URL to the web server 81 (S3). In response to this first URL, the web server 81 would initiate the selected test.

In the example, assume that the selected test is a throughput test from the test server 83. In step S4, the web server 81 notifies the server 83 of the subscriber's request for a throughput test, and the server 83 performs that test in step S5. Essentially, the server 83 communicates with the user's PC 25, to determine the maximum rate available for communications between itself and the customer's PC 25. The server 83 communicates the results to the web server 81 (at S6), which provides those results as a report contained in the next web page sent for display to the user via the PC screen (at S7). At this point, the displayed page would show the current throughput rates between the server 83 and the user's PC 25, and hence the rates through the line, the DSLAM 17 and the VSI switch 19 including through potential congestion points CP #1 and CP #2.

To this point, the servers 81, 83 can show the user that there is connectivity over the line to the DSLAM 17, that there is a cross-connect through the DS-3 and the VSI switch 19 to the local services domains and the rate of communications throughput between the server 83 and the PC 25. If the user is experiencing slow service, but the assessments performed so far do not isolate the cause of the poor performance, the user may select another test from one of the pages offered by the web server 81. Upon entry of this next selection, the PC 25 sends the appropriate URL through the network to the web server 81 (S8).

Several examples of the additional test options are discussed below. Those skilled in the art will recognize that the systems illustrated may perform these various tests and others in any order selected by the customer during the interactive session with the web server 81.

For example, monitoring equipment normally associated with the gateway router 29 maintains status information regarding the PVCs serviced through that router. For example, a Redback implementation of the gateway router 29 has an associated Electronic Management Server (EMS) 91. For an end user customer, the EMS 91 or other monitor system will maintain a record of the time of the last Ethernet from transported upstream from the end user, for example, based on identification of the user-device MAC address.

In accord with the invention, if the customer makes the appropriate selection, the web server 81 will inform the test server 83; and the application 87 in the server 83 will launch a query to the EMS monitor 91 associated with the gateway router 29 (S9). The query asks the EMS 91 to determine the last time of the last frame or packet transported through the router for the particular user's MAC address. For this purpose, the server 83 could send SNMP traps, as queries, to the EMS 91 of the gateway router 29 to request the desired information regarding the status of the customer's PVC.

If the last packet transport for the customer was relatively recent, then the SONET link between the VSI switch 19 and the router 29 is operational. It is also possible to instruct the user's PC 25 to send one or more new packets and check the transport timing again, to confirm connectivity and assess the time required to pass the packet upstream through the gateway router 29. The EMS 91 will return the latest information regarding the packet transport for the identified subscriber. The data supplied by the EMS 91 provides an indication of the health of the SONET link forming point CP #3 as well as the status of the router 29 itself, including CP #4.

The EMS 91 sends the data as results information back to the test server 83, which in turn forwards the data to the web server 81 (S10). The web server formats the results as a web page providing a report on the performance at CP #3 and CP #4, and transmits that page back through the network to the user's PC 25 (S11).

To further assess the throughput at CP #3 and/or CP #4, an embodiment might include a throughput server (not shown) associated with the gateway router 29. This server would function in a manner generally similar to the server 133 in the prior art, however, the connection of the server to the relevant PVCs and the initiation of the throughput test by the server would be controlled from the web server 81 and test server 83. The throughput server would provide the results to the server 83 and 81, for reporting to the end user through the PC 25. The throughput test could be included with the information from the EMS 91 as part of a single test and report procedure, of the throughput test could be operated in response to a separate selection by the user.

Also, as noted earlier, this DSLAM 17 may monitor the operational rates of the modem communications. The web server 81 and test server could obtain and present such rate information for the customer, in a manner analogous to that of the packet time information obtained from the EMS 91. In some cases, the methodology may also obtain and report status or rate information from the VSI switch 19.

If the ISP provides a throughput server 97 on their router 31, it is possible to initiate a throughput test in the same fashion from the web server 81, where the throughput is to and from the ISP. The carrier may also choose to operate another throughput server 97 on the public Internet 11.

To this point, the monitoring, surveillance and quality assurance procedures have additionally shown the user that there is connectivity through the VSI switch 19 and the router 29 and possibly the rate of communications throughput between the gateway router 29 and the PC 25. In addition to the earlier report of results regarding points CP #1 and CP #2, the user has now obtained information about points CP #3 and CP #4. If the user is experiencing slow service, but the assessments performed so far still do not isolate the cause of the poor performance, the user may select another test from one of the pages offered by the web server 81. Upon entry of this next selection, the PC 25 sends the appropriate URL through the network to the web server 81 (S12).

In the preferred embodiment, the user interface via the web server 81 enables the user to trigger a throughput test in a similar fashion, to test the throughput to and from the ISP router 31 or the public Internet. In each case, the web server 81 provides one or more pages to the user PC 25 for display, which show the user the results of the respective throughput tests.

In accord with the invention, if the customer makes the appropriate selection, the web server 81 will inform the test server 83; and the application 87 in the server 83 will launch a query to the server 97 associated with the gateway router 29 or to the server 93 on the Internet (S13). The respective the server 93 or 97 communicates with the user's PC 25, to determine the maximum rate available for communications between itself and the customer's PC 25 (S14). The server 93 or 97 communicates the results to the application 87 in the test server 83, which in turn forwards the results to the web server 81 (at S15). The web server formats an appropriate web page for reporting the latest throughput test results and forwards that web page sent for display to the user via the PC screen (at S16).

The servers 81, 83 can also initiate trace routes through the public Internet 11, to determine if parts of the Internet are down or heavily congested. The web server can initiate testing to determine the extent of conformance to SLAs associated with different services.

The throughput determinations in the tests outlined above related to overall throughput through links to and from the customer premises equipment. In a further enhancement, the web server 81 may offer the user options to test throughput with regard to specific services, such as a video service and/or a voice over IP service having specific associated SLAs. The respective throughput server would likely transmit more data for each service than is allowed under the SLAs and then determine the results actually communicated to and from the subscriber's equipment, to determine how much capacity is available to each QoS tier that the network is providing to the particular subscriber.

In the above discussed embodiments, the customer's PC 25 initiated a communication with the web server 81, and in some cases selected a throughput test from the server 83. These procedures showed connectivity between the server(s) 81, 83 and the customer's PC 25. Preferably, the PC 25 and/or one of the servers offers additional options for connectivity testing. Preferably, the client PC 25 and the web server 81 and/or the test server 83 each perform their own connectivity tests to different test points. In operation, the client would use its own layer 2 path to communicate to or through the ISP router 31. This communication tests the connectivity through the customer's PVC as well as the PVC of the ISP. This test may also include a throughput test.

In a preferred embodiment, one or both of the servers 81, 83 also has a layer 2 path to get to the gateway router 29 for communications with the ISP. During a test operation, the server(s) 81, 83 would use that layer 2 path to communicate to or through the ISP router 31. This communication tests the connectivity in general, through the VSI switch 19, the gateway router 29 and the cell relay network to the ISP. This test also may include a rate test of the network throughput. If one path worked and one didn't that would also provide useful information as to the kind and location of any trouble, i.e., does the trouble affect only that subscriber or is it a more generalized issue.

The present invention also embodies reporting any detected troubles to appropriate personnel of the carrier. For example, if one of the tests outlined above shows the customer that a segment of the network is not providing the necessary connectivity or is congested, the web server 81 gives the customer the option to generate a trouble report. If selected by the customer, the server 81 formulates a trouble report identifying the customer and providing all assessment data about the customer's service compiled during the interactive procedure, up to the time of the report. The server 81 forwards the trouble report to an appropriate operations support system for delivery to carrier personnel, for example, for display on a terminal the same as or similar to the workstation 89 at the NOC.

The discussion of the first embodiment (FIG. 8A) of the monitoring, surveillance and quality assurance method included a number of throughput tests. The discussion of the tests assumed that the respective server calculated the test results, that is to say the detected throughput levels, and sent those results to the web server for reporting to the user. This approach may be advantageous where the user device has limited capabilities. However, in a preferred embodiment, the customer PC 25 has the software capability to calculate one or more of the rates during each throughput test. FIG. 8B shows several steps, as they relate to throughput testing, for use in an enhanced version of the monitoring, surveillance and quality assurance of FIG. 8A.

In the process of FIG. 8B, the user would access the web server and select one or more tests, as in the embodiment of FIG. 8A. Again, the customer's PC 25 would receive and display a web page offering the user an option to obtain a throughput test. If the user then clicks on the appropriate link to chose a throughput test, the PC 25 transmits the appropriate URL to the web server 81 (S81 in FIG. 8B). In this first example, assume that the selected test is a throughput test from the test server 83. In step S82, the web server 81 notifies the server 83 of the subscriber's request for a throughput test, and the server 83 performs that test in step S83. Again, the server 83 communicates with the user's PC 25, but in this version, the software in the customer's PC 25 determines the maximum rates available to and from the PC 25 (S84). Typically, the software will provide the rate information as part of the display to the user. If appropriate, the PC 25 may communicate the results to the web server 81 (at S85), for example, for inclusion in a trouble-report to appropriate technical personnel. As in the technique of FIG. 8A, the display to the user would show the current throughput rates between the server 83 and the user's PC 25, and hence the rates through the line, the DSLAM 17 and the VSI switch 19 including through potential congestion points CP #1 and CP #2.

As in the earlier embodiment, the user can select other throughput tests. One option might be to select a throughput test from a server (not shown) associated with the gateway router 29. The test would be conducted essentially as in steps S81 to S84 or S85, as in the first example. Again, the PC 25 would locally calculate and display the results to the user. To appreciate this further operation, consider an example where the user selects a throughput test from either the server 93 or the server 97.

To initiate the test operation, the user selects the corresponding link from a displayed web page, and the PC 25 sends the appropriate URL through the network to the web server 81 (S91). The server 81 informs the test server 83; and the application 87 in the server 83 will launch a query or instruction to the particular server 93 or 97 offering the selected throughput test (S92). The respective server 93 or 97 communicates with the user's PC 25 for the throughput test (S93). In this embodiment, the software in the customer's PC 25 determines the maximum rates available to and from the PC 25 (S94), and the software provides the rate information as part of the display to the user. The PC 25 also may communicate the results to the web server 81 (at S95), for example, for inclusion in the trouble-report to appropriate technical personnel.

The hardware of a server system, such as the server 81 or the server 83, corresponds to that of a typical general-purpose computer, comprising a central processing unit (CPU) formed for example of one or more microprocessors, a number of memory devices and an interface to the data communication network, in this case to the IP network forming the respective domain 13 or 33. Such a server computer may also provide a local or remote graphical user interface (GUI) for operation and control of the server by carrier personnel or ISP, for example from the NOC workstation 89. Such an interface, for example, may comprise a common type of display, a keyboard and one or more of the common types of cursor controls. Various media, readable by such a computer system, may store or carry the executable code and any associated data for the respective application, for example the web pages provided by the server 81 and/or the associated code of the test application 87, 95 or 99.

As noted, certain aspects of the invention relate to the software elements, such as test applications 87, 95 and 99 and the user interface programming on the web server 81. At different times all or portions of the executable code for any or all of these elements may reside in physical media or be carried by electromagnetic media. Physical media include the memory of the server(s) or PCs, such as various semiconductor memories, tape drives, disc drives and the like of general-purpose computer systems. All or portions of the software may at times be communicated through various networks, for example to load the software from another computer into the respective server or into another network element. Thus, another type of media that may bear the software includes optical, electrical and electromagnetic waves, such as used across physical interfaces between local devices, through wired and optical landline networks and over various air-links.

Those skilled in the art will recognize that the monitoring, surveillance and quality assurance techniques involved in the present inventions are amenable to a wide range of modifications and further enhancements.

For example, in one further enhancement of the network, the customer premises equipment (CPE) will include a home router or similar shared device coupled between the ATU-R and the actual user devices. The centralized CPE device would implement the PPPoE shim. The web server functionality, for isolation and analysis in accord with the present invention could be implemented in whole or in part at that CPE device.

The initial discussion assumed that the carrier operated the web server 81 and/or the test server 83. In practice, other parties may operate those servers, from the vertical services domain. For example, the ISP may contract with the carrier to operate such server(s) from the vertical services domain 13, to provide the monitoring, surveillance and quality assurance service for that ISP's customers.

Whether operated by the carrier or another entity, the servers providing the monitoring, surveillance and quality assurance service could provide an array of related troubleshooting services. For example, the servers could provide related security testing, for example, to test security and/or firewall features of the end user's equipment. These servers could download patches and/or software upgrades to improve service and/or implement new services.

In the examples discussed above, the user triggered the monitoring, surveillance and quality assurance operations through manual interaction with the web server 81. The present invention also encompasses automated initiation of the testing, for example on a periodic basis initiated by programming in a PC 25 or other customer premises equipment. Alternatively, one of the servers in the vertical services or network services domains may periodically initiate the testing and provide reports to the user and/or to technical personnel.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. A system of assessing and reporting operations in an access data network, said system providing services to customer premises equipment of an identified one customer through the access data network, said system comprising:
   a communication access node coupled to a wide area internetwork;
   a plurality of digital subscriber line transceivers, coupled to network ends of subscriber lines, for data communication with transceivers coupled to respective customer premises ends of respective subscriber lines;
   an access switch coupled for data communications with the digital subscriber line transceivers, for receiving data from customer premises equipment via respective ones of the digital subscriber line transceivers and for supplying data intended for transmission to line transceivers;
   a high-speed data link between said access switch and said communication access node;
   a local services network coupled locally to said access switch, wherein said access switch segregates upstream traffic from the respective customer premises equipment between said local services network and said high-speed data link to said communication access node, and said access switch aggregates downstream traffic from said local services network and said high speed data link from said communication access node for transmission to the respective customer premises equipment;
   a server coupled to said local services network;
   a user terminal adapted to conduct an interactive session with said server to initiate assessing and reporting operations;
   wherein said user terminal and said server are configured automatically to determine at least one state of the access data network in relation to a provision of the service to said customer premises equipment of the identified one customer through the access data network and to communicate information regarding said at least one state of the access data network to said user terminal for presentation to a user.

2. The system as in claim 1, wherein:
   the one customer has a logical circuit provisioned through the access data network, the logical circuit extending from the customer premises equipment of the one customer to the communication access node via the access switch and the high-speed data link, and
   the logical circuit comprises a layer-2 protocol logical communication circuit provisioned through the access switch and the high-speed data link.

3. The system as in claim 2, wherein the layer-2 protocol logical communication circuit comprises an Asynchronous Transfer Mode (ATM) virtual circuit.

4. The system as in claim 1, further comprising:
   continuing the interactive session between the user terminal and the server, to initiate a further assessment;
   in response to initiation of the further assessment, automatically determining at least one other state of the access data network in relation to provision of the service to customer premises equipment of the identified one customer through the access data network; and
   communicating information regarding the at least one other state of the access data network to the user terminal, for presentation to the user.

5. The system as in claim 1, wherein the user terminal comprises customer premises equipment of the identified one customer, and the interactive session is conducted via the access data network between the server and the customer premises.

6. The system as in claim 1, wherein the user terminal comprises a workstation for technical personnel concerned with operations of the access data network.

7. The system as in claim 1, wherein the step of automatically determining said at least one state of the access data network comprises conducting a throughput test between said server coupled to the local services network and said customer premises equipment of the one identified customer.

8. The system as in claim 1, wherein the step of automatically determining said at least one state of the access data network comprises conducting a throughput test between another server and said customer premises equipment of the one identified customer, wherein the other server is coupled to either the communication access node, a point of presence of a wide area service provider or the wide area internetwork.

9. The system as in claim 1, wherein the step of automatically determining said at least one state of the access data network comprises obtaining data relating to current performance of at least one element of the access data network.

10. A system comprising:
an access data network, for providing access services to a wide area domain and a logically separate local services domain, the access data network separating the two domains at least in part based on distinctions in types of protocols at a level above a protocol level used to define basic connectivity through the access data network to the wide area domain;
a web server, coupled to the local services domain, for interactive communication with a customer subscribing to wide area domain access service, through the access data network; and
means responsive to customer selections via the interactive communication with the web server, for automatically isolating selected points of the access data network and determining a current status of at least one element associated with each selected point effecting the wide area domain access service provided to the customer, and for providing results of each status determination to the web server;
a communication access node coupled to a wide area internetwork that forms the wide area domain;
a plurality of digital subscriber line transceivers coupled to network ends of subscriber lines, for data communication with transceivers coupled to respective customer premises ends of respective subscriber lines;
an access switch coupled for data communications with the digital subscriber line transceivers, for receiving data from customer premises equipment via respective ones of the digital subscriber line transceivers and for supplying data intended for transmission to predetermined customer premises equipment to the respective ones of the digital subscriber line transceivers;
a high-speed data link between the access switch and the communication access node;
a local services network forming the local services domain, coupled locally to the access switch,
wherein the access switch segregates upstream traffic from the respective customer premises equipment between the local services network and the high-speed data link to the communication access node, and the access switch aggregates downstream traffic from the local services network and the high-speed data link from the communication access node for transmission to the respective customer premises equipment.

11. A system of assessing operations of an access data network, said system comprising:
a communication access node coupled to a wide area internetwork;
a plurality of digital subscriber line transceivers, coupled to network ends of subscriber lines, for data communication with transceivers coupled to respective customer premises ends of respective subscriber lines;
an access switch coupled for data communications with the digital subscriber line transceivers, for receiving data from customer premises equipment via respective ones of the digital subscriber line transceivers and for supplying data intended for transmission to line transceivers;
a high-speed data link between said access switch and said communication access node;
a local services network coupled locally to said access switch, wherein said access switch segregates upstream traffic from the respective customer premises equipment between said local services network and said high-speed data link to said communication access node, and said access switch aggregates downstream traffic from said local services network and said high speed data link from said communication access node for transmission to the respective customer premises equipment;
a first server coupled for communication with said communication access node;
a user terminal of one customer is adapted to conduct a communications test with said first server, to assess a layer 2 connectivity for the one customer through the access data network; and
a second server, coupled to said local services network, is adapted to conduct a communications test with said first server, to assess a layer 2 connectivity from said access switch to said communication access node.

12. The system as in claim 11, wherein at least one of the communications tests comprises a throughput test communication.

13. The system as in claim 12, wherein the layer-2 protocol logical communication circuit comprises an Asynchronous Transfer Mode (ATM) virtual circuit.

14. A system as in claim 11, wherein:
the one customer has a logical circuit provisioned through the access data network, the logical circuit extending from the customer premises equipment of the one customer to the communication access node via the access switch and the high-speed data link, and
the logical circuit comprises a layer-2 protocol logical communication circuit provisioned through the access switch and the high-speed data link.

* * * * *